United States Patent [19]
Takagi

[11] Patent Number: 5,819,207
[45] Date of Patent: Oct. 6, 1998

[54] RELATIVE ANGLE DETECTING SYSTEM AND VIRTUAL REALITY PROVIDING SYSTEM USING THE SAME

[75] Inventor: Hiroshi Takagi, Kamakura, Japan

[73] Assignee: Mitsubishi Precision Co., Ltd., Tokyo, Japan

[21] Appl. No.: 760,590

[22] Filed: Dec. 4, 1996

[30] Foreign Application Priority Data

Dec. 11, 1995 [JP] Japan ..................................... 7-321899

[51] Int. Cl.⁶ .................................................. G01B 11/26
[52] U.S. Cl. .................................. 702/153; 345/7; 345/8;
340/630; 356/218; 356/438; 356/442
[58] Field of Search .............................. 364/559; 345/7,
345/8; 340/630, 693; 250/574; 356/438,
218, 442; 369/110

[56] References Cited

U.S. PATENT DOCUMENTS

| | | | |
|---|---|---|---|
| 5,506,705 | 4/1996 | Yamamoto et al. | 349/13 |
| 5,576,697 | 11/1996 | Nagashima et al. | 340/632 |
| 5,673,103 | 9/1997 | Inoue et al. | 355/71 |
| 5,683,297 | 11/1997 | Raviv et al. | 345/8 |

FOREIGN PATENT DOCUMENTS 6-95013  11/1994  Japan .

*Primary Examiner*—James P. Trammell
*Assistant Examiner*—Hien Vo
*Attorney, Agent, or Firm*—Merchant, Gould, Smith, Edell, Welter & Schmidt, P.A.

[57] ABSTRACT

A relative angle detecting system permitting a wider range of detectable angles and offering a small detection error by using polarization and a virtual reality providing system using the same are disclosed. The relative angle detecting system includes a light source having a given polarizing direction and a light reception unit in which a plurality of polarization filters having different polarizing directions other than 90 degree and a plurality of light-receiving devices for receiving light passing through the filters are incorporated, and a relative angle is calculated on the basis of a combination of strengths of output signals of the plurality of light-receiving devices.

33 Claims, 21 Drawing Sheets

OUTPUTS OF REFERENCE
LIGHT-RECEIVING DEVICES

ANGLE OF ROTATION

OUTPUT

0°  90°
ANGLE OF INCIDENCE

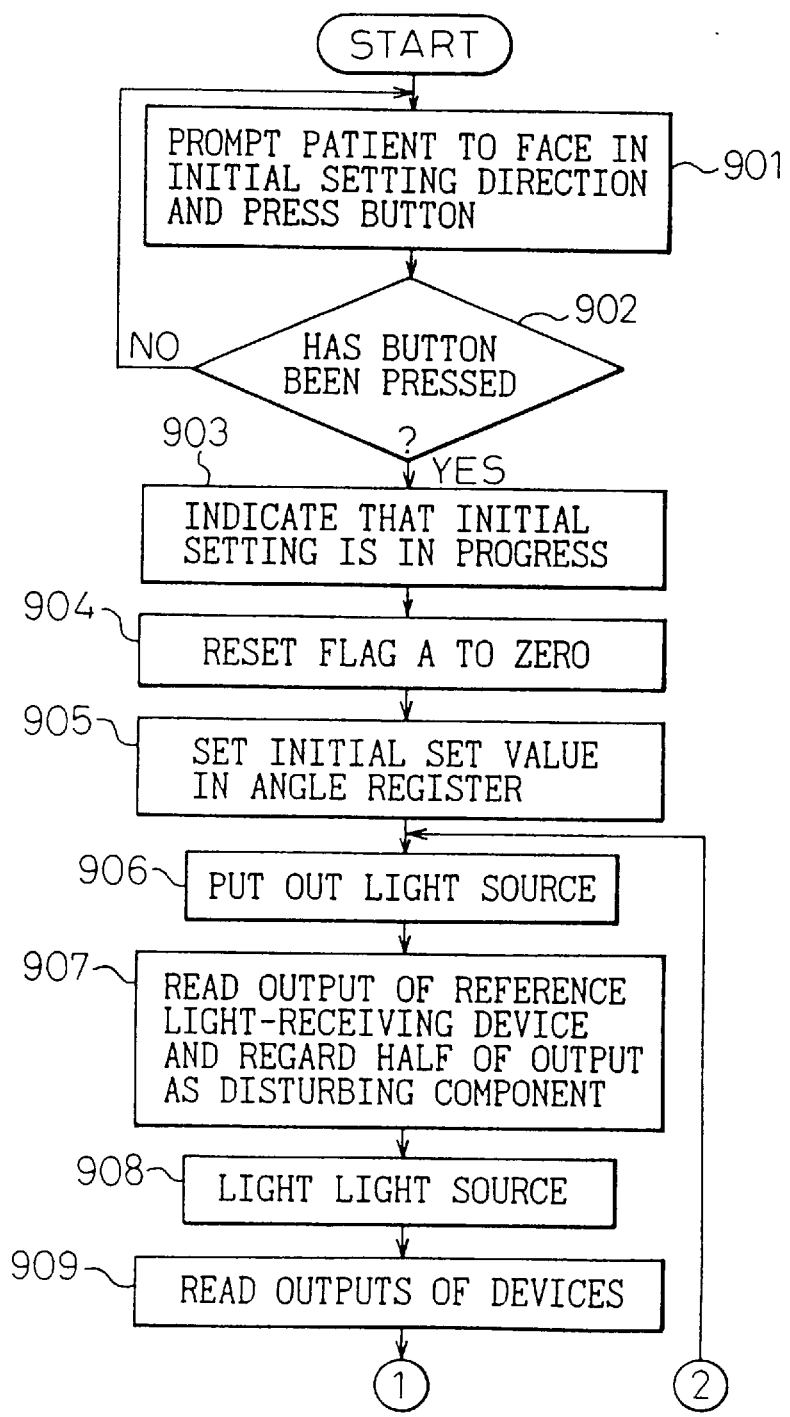

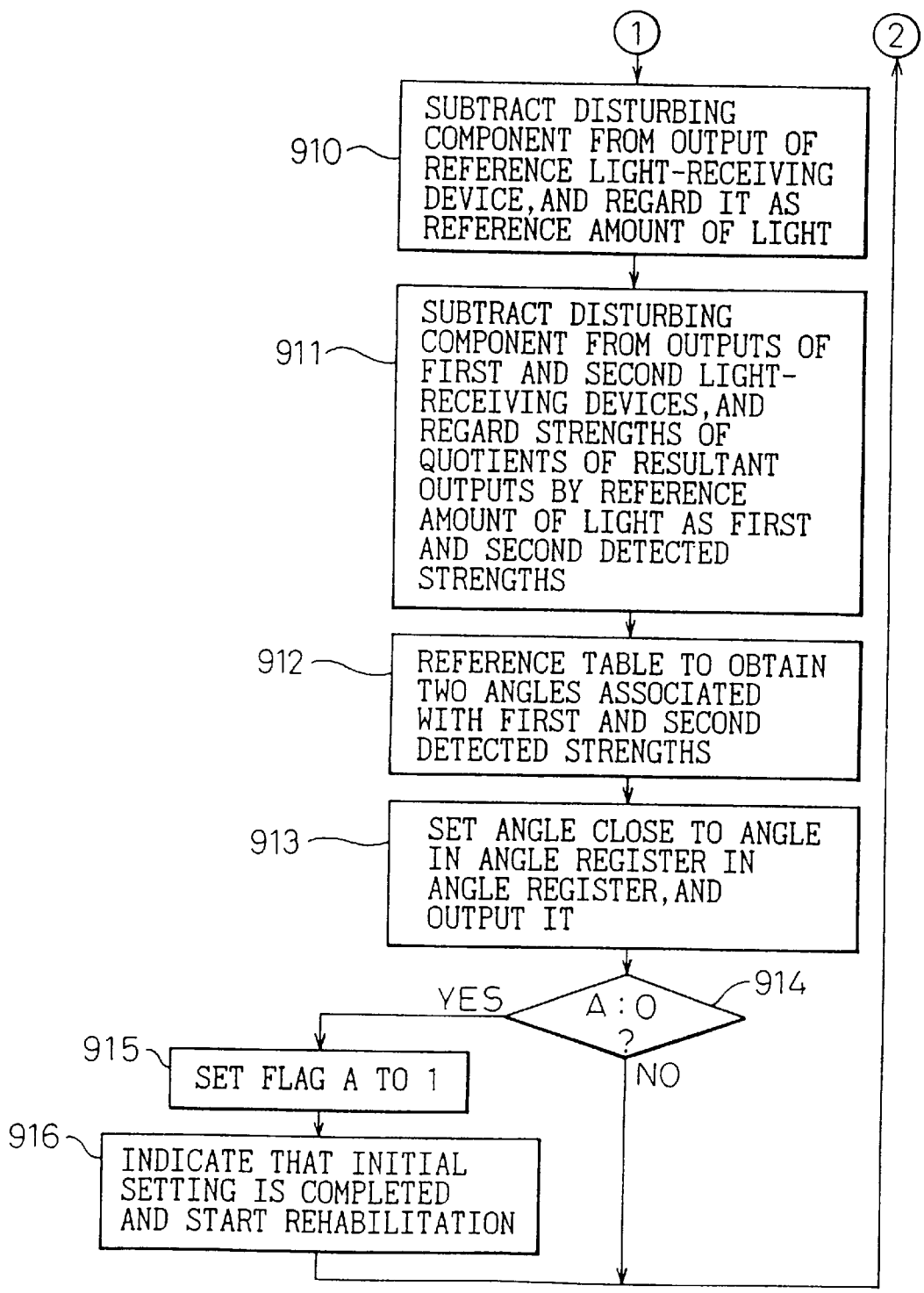

POLARIZING DIRECTION θ

OUTPUT

θ1-90°  θ2-180°  θ3+90°  θ4

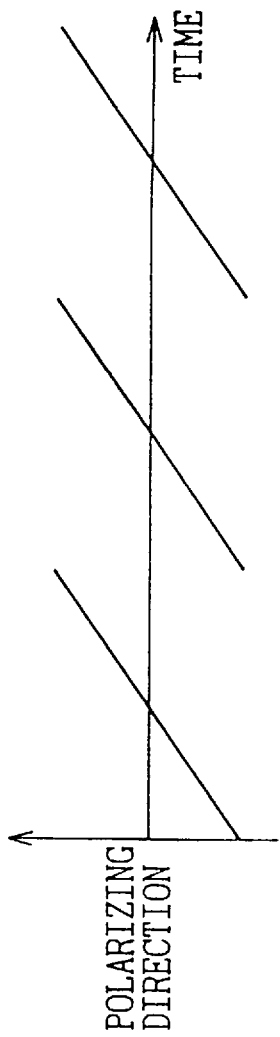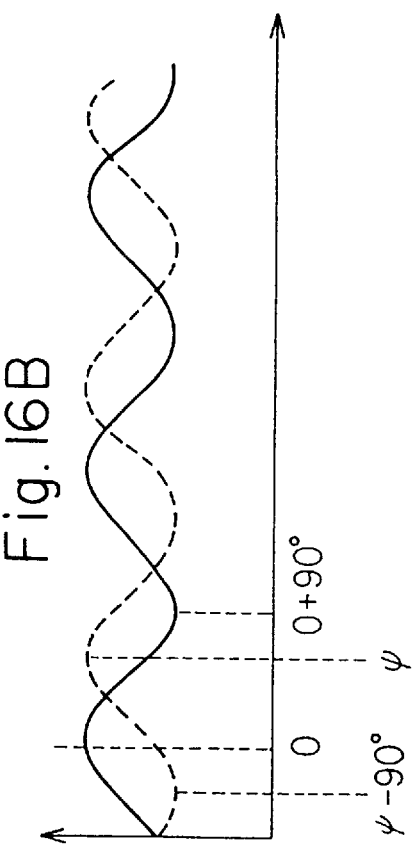

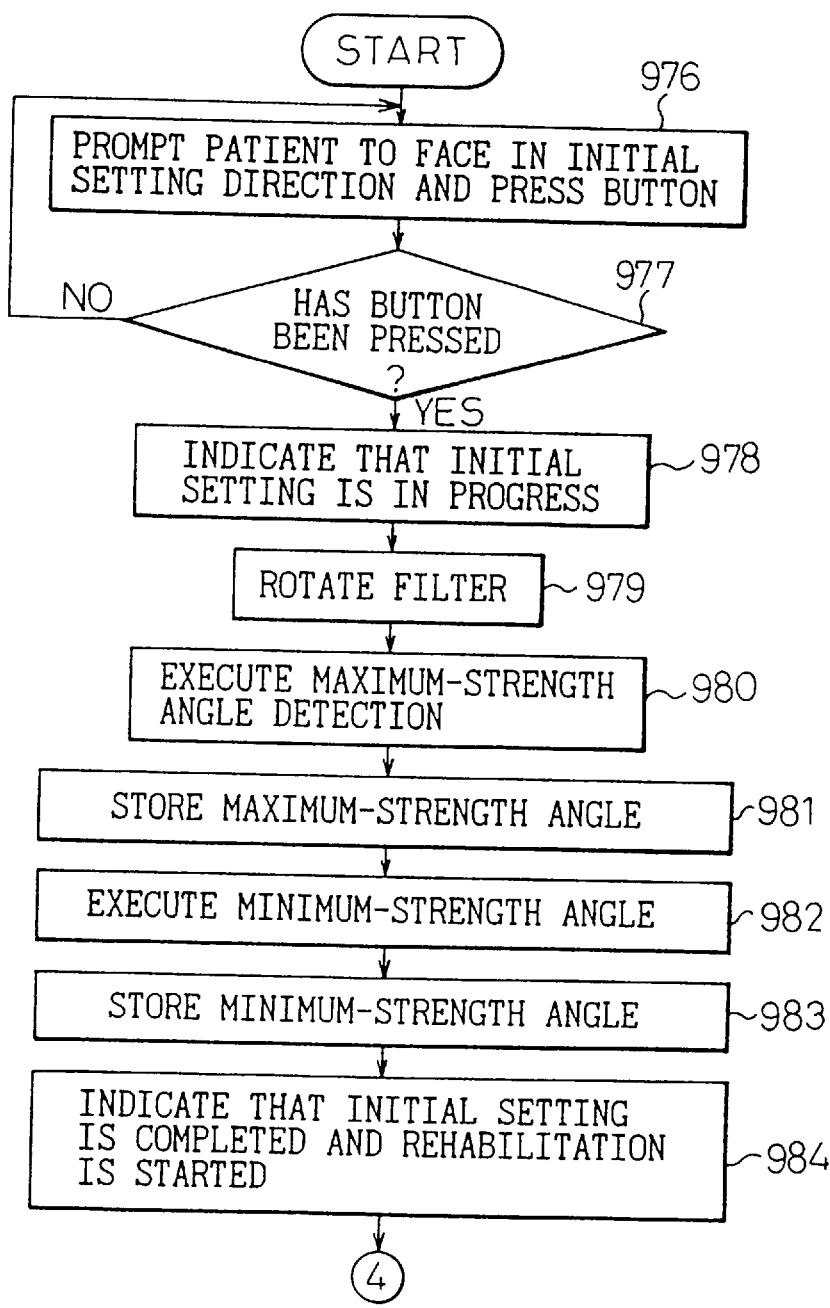

RELATIVE ANGLE DETECTING SYSTEM AND VIRTUAL REALITY PROVIDING SYSTEM USING THE SAME

BACKGROUND OF THE INVENTION

1. Field of the Invention

The present invention relates to a relative angle detecting system for detecting an angle of rotation of a mounted entity on a given plane and to a virtual reality providing system for varying images to be provided according to a direction in which a user faces and which is detected using the relative angle detecting system. In particular, this invention is concerned with a relative angle detecting system utilizing polarization and a virtual reality providing system using the relative angle detecting system.

2. Description of the Related Art

In recent years, a virtual reality providing system for giving a feeling of being in a three-dimensional space by providing the eyes with images having a difference corresponding to a parallax has been put to practical use and adapted to games or the like. The virtual reality providing system is expected to be applicable to a wider range of fields. Various proposals have been made for a method of providing the eyes with images having a difference corresponding to a parallax. The most typical method at present is such that what is referred to as a head-mounted display to be worn on the head, that is, a pair of combinations of a display such as a liquid-crystal display and a lens is located in front of the eyes in order to provide the eyes independently with images. A user wears the head-mounted display on his/her head, sees images that have a difference corresponding to a parallax and that are provided to his/her eyes, and feels as if he/she were in a three-dimensional space.

With regard to a game system, a player manipulates buttons and keys in a provided three-dimensional space and thus enjoys playing a game. The player plays a game with the head-mounted display worn on his/her head. For providing virtual reality successfully, when positions or oriented directions are changed, images to be provided must be varied according to the change. It is desirable to detect both a position and direction, and vary images according to the changes in position and direction. A virtual reality providing system generally provides images of an entity located far away. What is the most influential is therefore a change in direction. What is dealt with herein is, therefore, to detect a change in oriented direction, or in other words, the direction of a head-mounted display.

In a known virtual reality providing system, a gyro-sensor is attached to a head-mounted display in order to detect an angular speed of rotation and eventually detect the direction of the head-mounted display. However, a gyro-sensor offering high detecting precision is large in size and high in cost and cannot therefore be used for the head-mounted display to be worn on the head. A low-cost and lightweight gyro-sensor has been used. However, the demand for high detecting precision is not satisfied because of a large drift occurring over a period of time. Moreover, although it is a must that a head-mounted display becomes usable immediately after it is worn, it takes much time for the gyro-sensor to become stable after it is activated. This is a problem. Under these circumstances, there is a growing demand for a lightweight and low-cost relative angle detecting system capable of detecting the direction of a head-mounted display very precisely.

The present invention has been devised to realize a relative angle detecting system for detecting a change in direction of a head-mounted display in a virtual reality providing system. An invented relative angle detecting system can be adapted to any system other than the virtual reality providing system and is therefore not limited to the virtual reality providing system.

A relative angle detecting system utilizing polarization has been known as a relative angle detecting system where the part to be attached to a rotating entity is lightweight and compact. However, an angle uniquely detectable by the known relative angle detecting system utilizing polarization ranges from 0° to 90°. This poses the problem of too narrow a range of detectable angles. The relative angle detecting system cannot therefore be used when an object entity rotates 90° or more.

A known relative angle detecting method utilizing polarization has limitations in the correlation between a light source and light reception unit. When the light reception unit tilts with respect to the radiating direction of light or when there is disturbing light, a larger error occurs. The relative angle detecting method cannot therefore be adopted for detecting a change in direction of a head-mounted display in the aforesaid virtual reality providing system.

SUMMARY OF THE INVENTION

An object of the present invention is to realize a relative angle detecting system permitting a wider range of detectable angles and offering a small detection error by utilizing polarization, and to provide a virtual reality providing system using the relative angle detecting system.

According to the first aspect of the present invention, there is provided a relative angle detecting system characterized in that: a plurality of polarization filters having different polarizing directions other than 90° and a plurality of light-receiving devices for receiving light passing through the filters are incorporated in a light reception unit for receiving light radiating from a light source unit having a given polarizing direction; and a relative angle is calculated on the basis of a combination of strengths of output signals.

By detecting intensities of light beams passing through the polarization filters having different polarizing directions, an angle of rotation ranging from 0° to 180° can be detected according to a combination of the intensities. Thus, a range of detectable angles is widened. However, when a difference between the polarizing directions of the polarization filters is 90°, the signals output from the filters have the same strengths at the angles of rotation symmetrical to each other with respect to 90°. A unique angle of rotation cannot therefore be detected. For this reason, the difference between the polarizing directions should not be 90°.

For calculating a relative angle, desirably, a two outputs-vs.-angle table listing combinations of strengths of light signals passing through the polarization filters having different polarizing directions in association with angles from 0° to 180° is included so that an angle associated with a combination of strengths can be obtained by referencing the table. This enables fast computation. Needless to say, a relative angle may be calculated according to an expression.

According to the second aspect of the present invention, there is provided a relative angle detecting system having an initial angle setting means for indicating that a light reception unit lies within a given range of initial angles with respect to the polarizing direction of light emanating from a light source unit. An arithmetic means for calculating an angle has an angle register for storing a relative angle detected immediately previously. When the initial angle setting means indicates that the light reception unit lies within the range of initial angles, the arithmetic means calculates the relative angle of the light reception unit, and stores one of calculated relative angles, which satisfies the condition that the light reception unit lies within the given range of initial angles, in the angle register. During a relative angle detecting operation, one of calculated relative angles, which is closest to a relative angle stored in the angle register, is output as a detected angle. The detected angle is stored in the angle register in order to update the contents of the angle register. The relative angle detecting system according to the second aspect can detect even a relative angle that changes to outside the range from 0° to 180° as long as the relative angle changes sufficiently slowly and a change in angle within a relative angle calculation cycle is 90° or less.

According to the third aspect of the present invention, there is provided a relative angle detecting system in which: a reference light-receiving device is located in the vicinity of a light-receiving device for detecting an angle; after the output of the light-receiving device for detecting an angle is normalized relative to the output of the reference light-receiving device, a relative angle is calculated. According to the third aspect, the output of the light-receiving device for detecting an angle is normalized relative to the output of the reference light-receiving device. This results in a reduced error.

According to the fourth aspect of the present invention, a light source unit radiates polarized light intermittently. An arithmetic means calculates a disturbing component on the basis of the output of a light-receiving device provided when the light source unit does not radiate polarized light, and calculates a relative angle on the basis of a signal strength calculated by subtracting the disturbing component from the output of the light-receiving device provided when the light source radiates polarized light.

According to the fifth aspect of the present invention, a light source unit changes the intensity of polarized light emanating from the light source unit at intervals of a given cycle, bandpass filters are included to pass components of output signals of first and second light-receiving devices, of which cycles substantially coincide with the given cycle, and a relative angle is calculated on the basis of signals passing through the bandpass filters.

The light source unit comprises a light source and a polarization filter passing light emanating from the light source. When a mounted unit is movable to some extent on a plane perpendicular in a radiating direction, polarized light must be radiated over a wide range. Since there is difficulty in radiating polarized light in a wide range using a single light source and polarization filter, a plurality of light source assemblies each composed of a light source and polarization filter are set in array and arranged so that polarized light rays emanating from adjoining irradiation assemblies mutually overlap at a position at which a light reception unit is located.

For alleviating the influence of disturbing light, the wavelength of the light emanating from a light source unit is limited to a narrow range. A light reception unit is provided with a color filter passing light whose wavelength falls within the range.

According to the sixth aspect of the present invention, there is provided a relative angle detecting system for detecting an angle of rotation with respect to a given initial direction on a given plane of a mounted unit. The relative angle detecting system comprises: a light source unit, located separately from a light reception unit, for radiating polarized light whose polarizing direction changes at intervals of a given cycle; a light reception unit, including a polarization filter united with the light reception unit, for receiving light emanating from the light source unit, and a light-receiving device for receiving light that emanates from the light source unit and passes through the polarization filter; and an arithmetic means for calculating the relative angle of the light reception unit with respect to the given initial direction on the basis of the polarizing direction of light emanating from the light source unit at a time instant at which a signal output from the light-receiving device has a given strength.

Since the polarizing direction of polarized light emanating from the light source unit changes at intervals of a given cycle, even if the direction of the light reception unit is constant, the output signal of the light-receiving device varies at intervals of the given cycle. When the polarizing direction of light emanating from the light source unit coincides with the polarizing direction of the polarization filter, that is, when a difference between the polarizing directions is 0°, the cyclically-varying signal has a maximum strength. When the difference between the polarizing directions is 90°, the signal has a minimum strength. When the difference between the polarizing directions is 45°, the signal has a strength between the maximum and minimum strengths. From this viewpoint, the polarizing direction of light emanating from the light source unit is detected at a time instant at which the output signal of the light-receiving device has a given strength such as the maximum strength, minimum strength, or an intermediate strength between the maximum and minimum strengths. Thus, the polarizing direction of the polarization filter is identified.

A change in strength of a detected signal due to a change in polarizing direction of radiated light is maximized when the output signal of the light-receiving device has substantially a strength between the maximum and the minimum strengths. It is therefore advantageous in terms of detecting precision to detect a time instant at which the output signal has a strength between the maximum and minimum strengths.

For changing the polarizing direction of radiated light, for example, rotating means are included to rotate the polarization filter.

According to the seventh aspect of the present invention, there is provided a virtual reality providing system in which a head-mounted display being worn on a user's head and including an image display means for providing the user's eyes with images is used to provide the user with a three-dimensional image by differentiating the images to be provided to the user's eyes according to a parallax. The virtual reality providing system is characterized in that the aforesaid relative angle detecting system is used to detect the direction of the head-mounted display, and images to be provided are varied depending on the detected direction of the head-mounted display.

For further expanding a range of detectable angles, when an initial angle setting means is included, a button switch is used as the initial angle setting means. A user manipulates this button switch while facing in a given direction and thus indicates that the direction in which the user faces is a given initial direction.

For minimizing the incidence of light other than polarized light emanating from a light source unit on a light reception unit, preferably, a light-interceptive means is included. For example, a light-interceptive curtain is used as the light-interceptive means.

In a relative angle detecting system of the present invention, a light reception unit to be attached to an entity whose direction is to be detected is compact and lightweight. The light reception unit can be attached to a head-mounted display readily and will not impair the maneuverability of the head-mounted display. A range of detectable angles is ±90° (180° as a whole). The relative angle detecting system can therefore be adapted for detection of almost all changes in direction. Moreover, if an initial angle setting means and angle register are included so that an operation of finalizing a detected angle on the basis of a relative angle detected immediately previously is repeated, the relative angle detecting system can be adapted for uses in which a wider range of detectable angles is required.

BRIEF DESCRIPTION OF THE DRAWINGS

The present invention will be more clearly understood from the description as set below with reference to the accompanying drawings, wherein:

FIG. 1A shows a configuration, and FIG. 1B shows the variation of a signal proportional to a change in angle;

FIG. 2A shows a configuration, and FIG. 2B shows the variations of signals proportional to a change in angle;

FIG. 3A shows a configuration, and FIGS. 3B and 3C show the variation of a signal proportional to a change in angle;

FIGS. 10A and 10B are flowcharts describing processing in the first embodiment;

FIGS. 16A and 16B are diagrams for explaining processing in the third embodiment;

FIGS. 19A and 19B are flowcharts describing processing in the fourth embodiment.

DESCRIPTION OF THE PREFERRED EMBODIMENTS

Before proceeding to a detailed description of the preferred embodiments of the present invention, a prior art relative angle detection method will be described with reference to the accompanying drawings relating thereto for a clearer understanding of the difference between the prior art and the present invention.

Figure 1A:
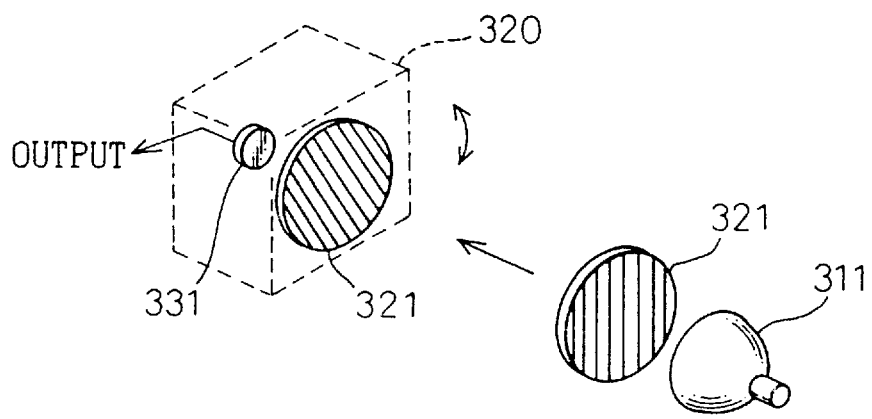
FIGS. 1A and 1B illustrate a known angle detecting method utilizing polarization.
Figure 1B:
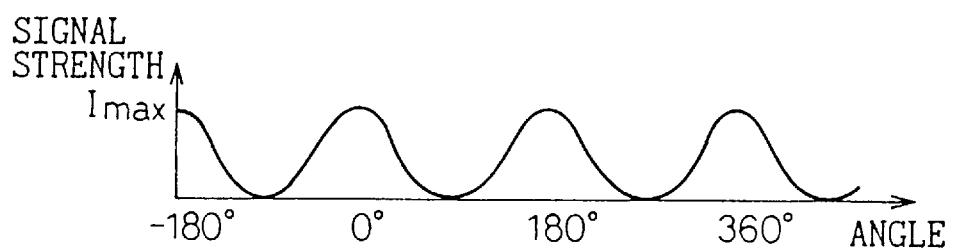

FIGS. 1A and 1B illustrate a known relative angle detecting method utilizing polarization, FIG. 1A shows a fundamental configuration, and FIG. 1B shows the variation of a signal proportional to a change in angle.

In FIG. 1A, there are shown a light source 311, a polarization filter 312, a polarization filter 321, and a light-receiving device 331. The polarization filter 321 and light-receiving device 331 are united with a light reception unit 320. The light reception unit 320 is attached to an entity whose angle of rotation is to be detected. The light source 311 and polarization filter 312 are stationary and radiate polarized light in a direction of an arrow. The polarizing direction of radiated light is fixed and defined with any angle on a plane perpendicular to a radiating direction. The angle defines a reference direction. The polarization filter 321 and light-receiving device 331 are arranged to receive the polarized light. Light passing through the polarization filter 321 has the highest intensity when the polarizing directions of the polarization filters 312 and 321 coincide with each other. When the polarizing directions differ from each other by 90°, the light has the lowest intensity. Almost no light therefore falls on the light-receiving device 331. When the polarization filter 321 is rotated, the output of the light-receiving device 331 varies as shown in FIG. 1B. That is to say, the output of the light-receiving device 331 varies as a function of Imax(1+cosθ)/2 where θ denotes an angle of the polarizing direction of the polarization filter 321 with respect to the polarizing direction of the polarization filter 312. As long as the intensity of light output from the light source 311 is constant, when θ is 0° or 180°, the maximum strength Imax of the output of the light-receiving device 331 is constant. Assuming that a detected signal strength is I, an angle θ is expressed as follows:

$$\theta = arccos(2I/Imax - 1) \tag{1}$$

Thus, the angle θ can be calculated using the strength of an output signal of the light-receiving device 331.

However, according to the known relative angle detecting method, as shown in FIG. 1B, the signal strength is the same when the angle is −45° and +45° that are symmetrical to 0°. It cannot be judged if the angle is either −45° or +45°. A uniquely-detectable angle therefore ranges from 0° to 90° (from −45° to +45°). When an object entity whose relative angle is to be detected rotates 90° or more, the known relative angle detecting method cannot be adopted.

Moreover, when the intensity of light output from the light source 311 is constant, if the polarization filter 321 and light-receiving device 331 rotate on a plane perpendicular to the irradiating direction, the maximum strength Imax of the output of the light-receiving device 331 is constant. However, when the polarization filter 321 and light-receiving device 331 tilt with respect to the irradiating direction of light or when disturbing light is present, the maximum strength Imax is not constant and a large error occurs in calculation of the angle 0 based on the aforesaid expression. The known relative angle detecting method cannot therefore be adopted to detect a change in direction of a head-mounted display in a virtual reality providing system.

Figure 2A:
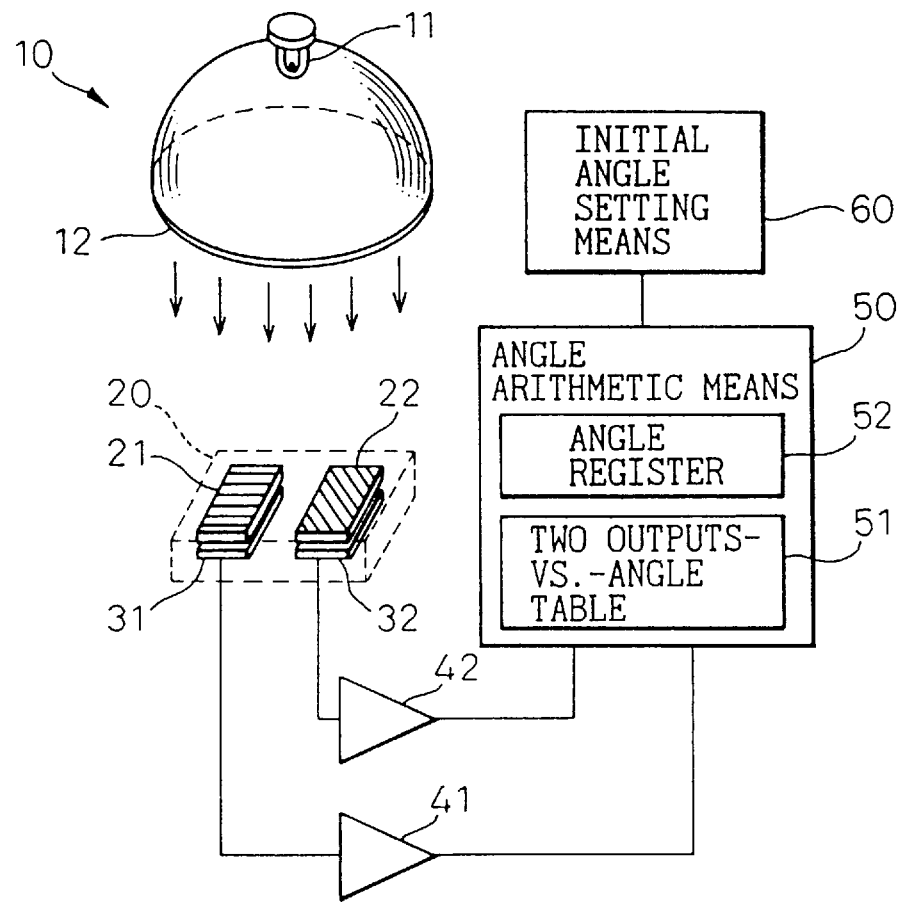
FIGS. 2A and 2B illustrate the basic constitution of the first aspect of the present invention.
Figure 2B:
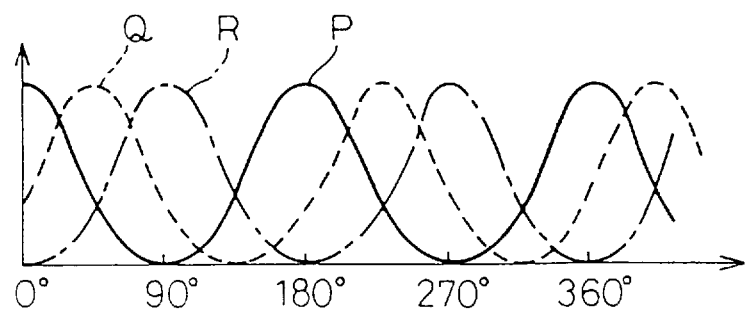

FIGS. 2A and 2B illustrate the fundamental constitution of a relative angle detecting system of the present invention, FIG. 2A shows a configuration, and FIG. 2B shows the waveforms of signals.

As shown in FIG. 2A, a relative angle detecting system according to the first aspect of the present invention is a relative angle detecting system for detecting an angle of rotation with respect to a given initial direction on a given plane of a mounted unit. The relative angle detecting system comprises: a light source unit 10, separated from the unit, for radiating polarized light, of which polarizing direction is defined with respect to a given initial direction, in a direction substantially perpendicular to a given plane; a light reception unit 20 being united with the mounted unit and including a first polarization filter 21 for receiving light emanating from the light source unit 10, a second polarization filter 22 adjoining the first polarization filter 21 on the same plane so as to receive light emanating from the light source unit 10, and having a polarizing direction that is different by any angle other than 90° from the polarizing direction of the first polarization filter 21, a first light-receiving device 31 for receiving light emanating from the light source unit 10 and passing through the first polarization filter 21, and a second light-receiving device 32 for receiving light emanating from the light source unit 10 and passing through the second polarization filter 22; and an arithmetic means 50 for calculating the relative angle of the mounted unit with respect to the given initial direction on the basis of a combination of strengths of signals output from the first light-receiving device 31 and second light-receiving device 32.

FIG. 2A shows variations of outputs provided when polarized light emanating from the light source unit 10 is received by the light-receiving devices located behind the rotating polarization filters. P, Q, and R denote outputs provided when the polarization filters located at different initial angles are rotated at the same rotating speed. The output Q is provided by one polarization filter whose initial angle is different by 45° from that of the other polarization filter providing the output P. The output R is provided by one polarization filter whose initial angle is different by 90° from the one of the other polarization filter providing the output P. The signals have the same waveform as that shown in FIG. 1B. As described in conjunction with FIG. 1B, the signal P has different strengths at an angle of rotation ranging from 0° to 90°. However, when the angle of rotation exceeds 90°, the signal assumes the same strength at a plurality of angles of rotation. In contrast, the combination of the strengths of the signals P and Q has different values at the angle of rotation ranging from 0° to 180°. Thus, when intensities of light beams passing through polarization filters having different polarizing directions are detected, an angle of rotation ranging from 0° to 180° can be detected on the basis of the combination of the intensities. This results in an expanded range of detectable angles.

However, as observed in the combination of the strengths of the signals P and R, when the polarizing directions of the polarization filters are different from each other by 90°, the strengths of the resultant signals have the same values at the angles of rotation symmetrical to each other with respect to 90°. The angle of rotation cannot therefore be determined uniquely.

Even if three polarization filters having different polarizing directions are used, the combination of the strengths of resultant signals has the same value in increments of 180° of an angle of rotation. The range of detectable angles does not therefore expand beyond 180°. However, the number of polarization filters having different polarizing directions may be increased.

For calculating a relative angle by means of the arithmetic means 50, preferably, a two outputs-vs.-angle table 51 that lists combinations of strengths of light signals passing through polarization filters having different polarizing directions in association with relative angles 0° to 180° (−90° to +90°) is installed in the angle arithmetic means 50. The angle arithmetic means 50 references the table to obtain an angle associated with a combination of strengths. This enables fast computation. Needless to say, a relative angle may be calculated according to the expression (1). In this case, two angles each ranging from 0° to 180° are calculated by separately assigning strengths of light signals passing through the respective polarization filters to the expression. However, one angle is determined by assigning the combination of strengths of the light signals passing through the polarization filters having different polarizing directions to the expression.

Also included is an initial angle setting means 60 for indicating that a unit lies within a given range of initial angles with respect to a polarizing direction of light emanating from the light source unit 10. An angle register 52 for storing a relative angle detected immediately previously is installed in the arithmetic means 50. When the initial angle setting means 60 indicates that the unit lies within the range of initial angles, the arithmetic means 50 calculates the relative angle of the unit. A relative angle of calculated relative angles, which satisfies the condition that the unit lies within the range of initial angles, is stored in the angle register 52. For a relative angle detecting operation, a relative angle of calculated relative angles which is closest to the relative angle stored in the angle register 52 is output as a detected angle. The detected angle is stored in the angle register 52, whereby the contents of the angle register 52 are updated.

As mentioned above, since two polarization filters having different polarizing directions are used in combination, a range of detectable angles is expanded to be a range from 0° to 180°. The range of detectable angles is limited to the range from 0° to 180° all the same. By contrast, when the angle register 52 and initial angle setting means 60 are included, as long as a change in relative angle is sufficiently slow and a change in relative angle within a relative angle calculation cycle is 90° or less, even if the relative angle changes from 0° to a value exceeding 180°, the relative angle can be detected.

Figure 3A:
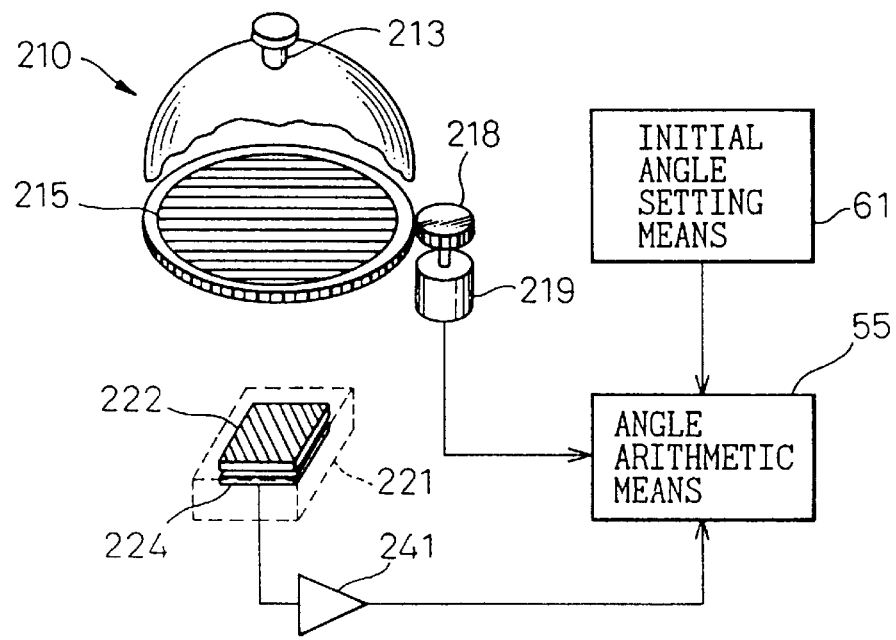
FIGS. 3A, 3B and 3C illustrate the basic constitution of the sixth aspect of the present invention.
Figure 3B:
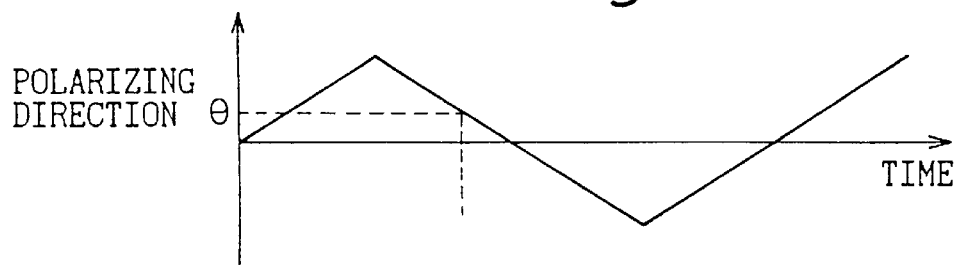
Figure 3C:
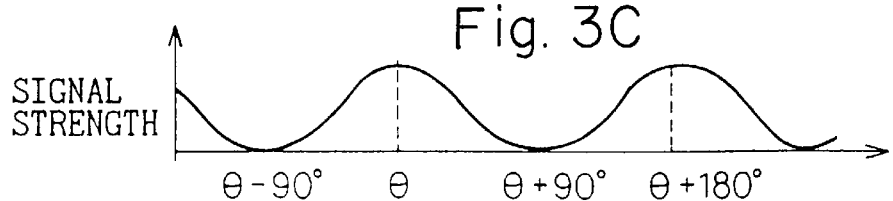

FIGS. 3A and 3B illustrate the fundamental constitution of a relative angle detecting system according to another aspect of the present invention, FIGS. 3B and 3C show a configuration, and FIG. 3B shows the waveform of a signal.

As shown in FIG. 3A, a relative angle detecting system according to another aspect of the present invention is a relative angle detecting system for detecting an angle of rotation with respect to a given initial direction on a given plane of a mounted unit. The relative angle detecting system comprises: a light source unit 210, separated from the unit, for radiating polarized light, of which polarizing direction changes at intervals of a given cycle, in a direction substantially perpendicular to the given plane; a light reception unit 221 being united with the unit and including a polarization filter 223 for receiving light emanating from the light source unit 210, and a light-receiving device 224 for receiving light that emanates from the light source unit 210 and passes through the polarization filter; and an arithmetic means 55 for calculating the relative angle of the unit with respect to the given initial direction on the basis of the polarizing direction of light emanating from the light source unit 210 at a time instant at which the signal output from the light-receiving device 224 has a given strength.

The polarizing direction of polarized light emanating from the light source unit 10 changes at intervals of a given cycle. Even if the direction of the unit is constant, as shown in FIG. 3B, the output signal FIG. 3C of the light-receiving device 224 varies at intervals of the given cycle. For example, when the polarizing direction of light emanating from the light source unit 10 coincide with the polarizing direction of the polarization filter 223, that is, when a difference between the polarizing directions is 0°, the cyclically varying output signal has a maximum strength. When the difference between the polarizing directions is 90°, the output signal has a minimum strength. When the difference between the polarizing directions is 45°, the output signal has an intermediate strength of the maximum and minimum strengths. From this viewpoint, the polarizing direction of light emanating from the light source unit 10 is detected at a time instant at which the output signal of the light-receiving device 224 has a given strength such as the maximum strength, minimum strength, or intermediate strength of the maximum and minimum strengths, the polarizing direction of the polarization filter 223 is identified. For example, assuming that an angle difference or the difference between the polarizing directions is within ±90°, when the output signal has the maximum strength, the polarizing direction of the polarization filter 223 coincides with the polarizing direction of light emanating from the light source unit 10. When the output strength has the minimum strength, the polarizing direction of the polarization filter 223 becomes a direction of ±90° relative to the polarizing direction of radiated light. When the output strength has the intermediate strength of the maximum and minimum strengths, the polarizing direction of the polarization filter 223 becomes a direction of ±45° relative to the polarizing direction of radiated light. As for ±45°, assuming that a change in angle within the aforesaid given cycle is sufficiently small, when the strength of the detected signal tends to increase, the polarizing direction of the polarization filter 223 becomes a direction of ±45° relative to the polarizing direction of radiated light. When the strength of the detected signal tends to decrease, the polarizing direction of the polarization filter 223 becomes a direction of ±45° relative to the polarizing direction of radiated light. Similarly to the first aspect, according to the sixth aspect, the range of detectable angles is ±90°, that is, a range from 0° to 180°.

A change in strength of a detected signal deriving from a change in polarizing direction of radiated light becomes maximum when an output signal has an intermediate strength of maximum and minimum strengths. It is therefore advantageous in terms of detecting precision to detect a time instant at which the output signal has the intermediate strength of the maximum and minimum strengths.

For changing the polarizing direction of radiated light, for example, rotating means 218 and 219 for rotating the polarization filter 215 are included.

According to the foregoing another aspect, the configuration including the initial angle setting means 61 and an angle register for storing a relative angle detected immediately previously by the arithmetic means 55, and the employment of a light-interceptive means for minimizing incidence of disturbing light on the light reception unit 20 or 221 would prove effective.

Figure 4:
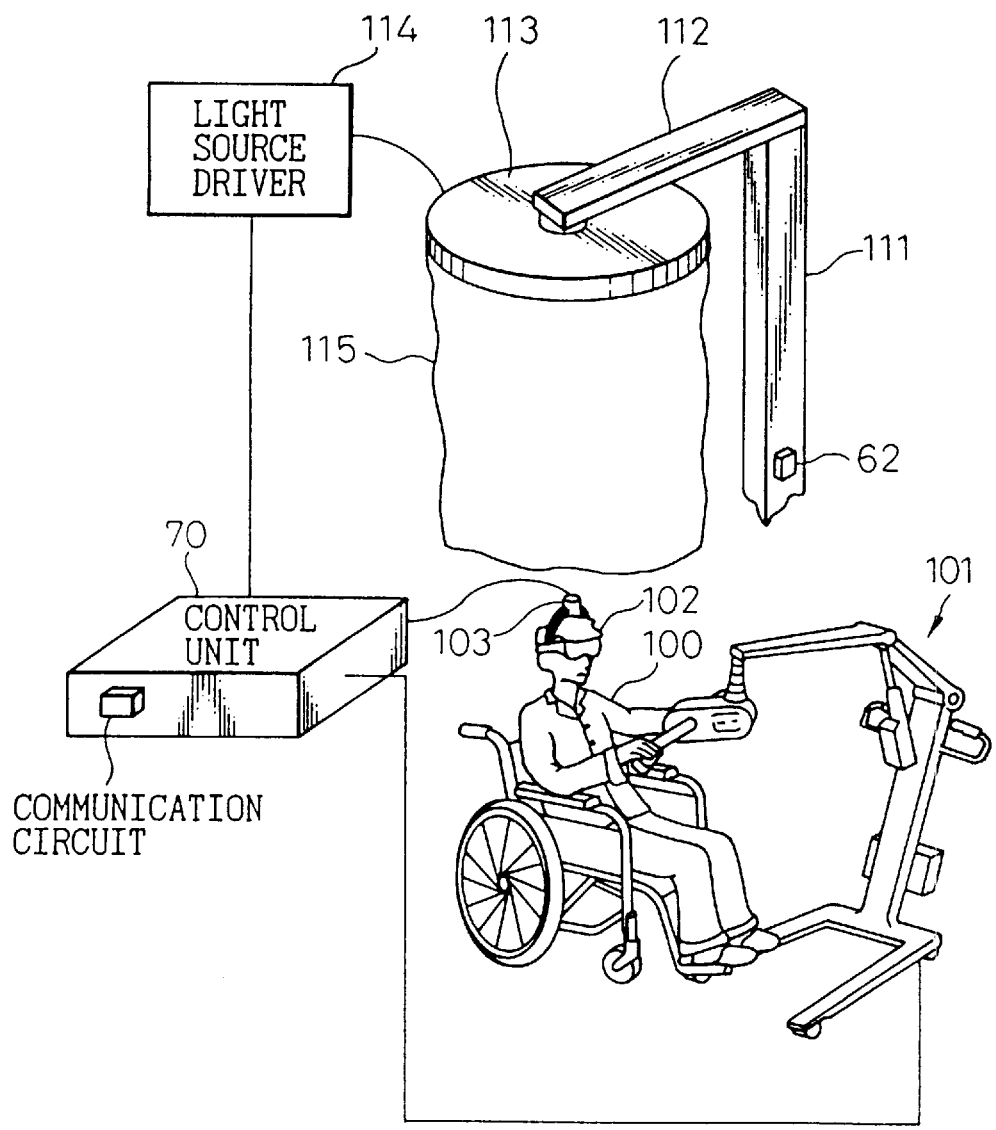
FIG. 4 shows the overall configuration of the first embodiment of the present invention.

FIG. 4 shows the overall configuration of a virtual reality providing system of the first embodiment of the present invention. The virtual reality providing system provides a patient, who needs rehabilitation, with virtual reality of moving outdoors, allows the patient to manipulate an instrument according to the virtual reality, and thus facilitates the efficacy of rehabilitation.

In FIG. 4, there are shown a patient 100 receiving rehabilitation, an instrument 101 for rehabilitation, a head-mounted display 102 to be worn on the head of the patient 100, a light reception unit 103 of a relative angle detecting system which is attached to the head-mounted display 102, columns 111 and 112, a light source unit 113 of the relative angle detecting system, a light source driver 114 for driving a light source in the light source unit 113, a light-interceptive curtain 115, a control unit 70 for controlling the whole system, and a button switch 62 for use in setting an initial angle.

The head-mounted display 102 includes a display means such as a liquid-crystal display and a projection lens which provide the eyes with independent images. The control unit 70 supplies an image signal to the display means so that images having a difference corresponding to a parallax can be provided to the eyes. The patient 100 sees the images having a difference corresponding to a parallax with the eyes and feels as if he/she were outdoors. The patient 100 manipulates the rehabilitation instrument 101 according to an instruction given with an aural signal sent from the control unit 70 while seeing the provided images. The control unit 70 detects a manipulated state, varies the images to be provided, and gives the sense of moving outdoors according to the patient's manipulation.

The patient 100 changes the orientation of his/her face while manipulating the rehabilitation instrument 101. For providing better virtual reality, it is necessary to vary images to be provided according to a change in orientation of the face. Preferably, changes in orientation of the face in all three axial directions should be detected and images should be varied according to the changes. However, what counts most in this kind of system is a change in orientation on a horizontal plane. For brevity's sake, therefore, only the change in orientation on the horizontal plane shall be detected in order to vary images.

The light source unit 113 corresponds to the light source unit 10 in FIG. 2A and is located above the position, at which the patient 100 manipulates the rehabilitation instrument 101, by means of the columns 111 and 112. The light reception unit 103 corresponds to the light reception unit 20 in FIG. 1, and is located on the top of the head-mounted display 102 to receive light emanating from the light source unit 10. The light source driver 114 controls the lit state of the light source in the light source unit 113 according to a control signal sent from the control unit 70. The control unit 70 varies images to be provided according to an angle of rotation on a horizontal plane which is detected by the light reception unit 103.

Aside from the relative angle detecting system, the virtual reality providing system and rehabilitation instrument are prior arts and have no direct relation to the present invention. The further description of the virtual reality providing system and rehabilitation instrument will therefore be omitted.

Figure 5A:
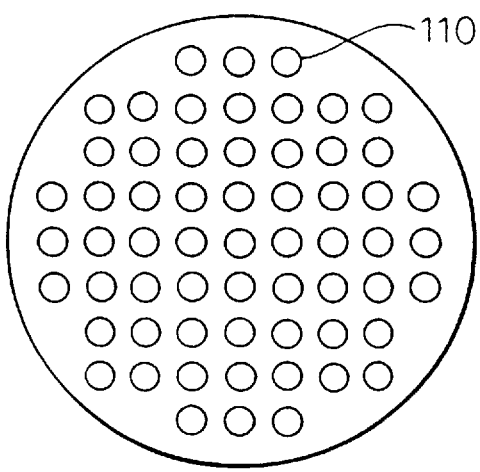
FIGS. 5A, 5B and 5C shows the structure of a light source unit in the first embodiment.
Figure 5C:
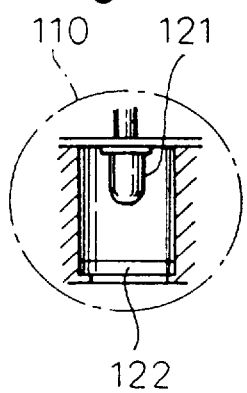
Figure 5B:
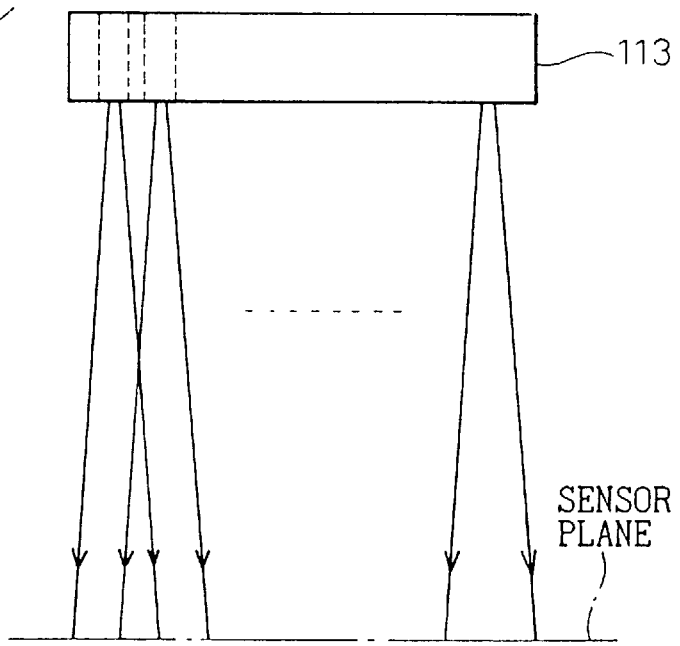

FIGS. 5A, 5B and 5C shows the structure of the light source unit 113.

As shown in FIGS. 5A, 5B and 5C the light source unit 113 is constructed by arranging numerous light source assemblies 110 each composed of an LED 121 and polarization filter 122. The LED 121 has directivity to some extent. Light rays emanating from adjoining light source assemblies 110 overlap on a sensor plane. The light reception unit 20 attached to the top of the head-mounted display 102 is located in the vicinity of the sensor plane. Light emanating from the LED 121 passes through the polarization filter 122 and becomes polarized light. Since the polarizing directions of the polarization filters 122 of the light source assemblies 110 are aligned with one direction. Light rays radiated downward from the light source unit 113 are polarized and have the same polarizing direction. The wavelength of light emanating from the LED 121 is generally about 30 nanometers and the light is monochrome. Light emanating from the light source unit 113 is used to detect the direction of the head-mounted display 102. Preferably, the patient is unaware of the light. Herein, an LED for radiating near-infrared rays is employed.

Figure 6:
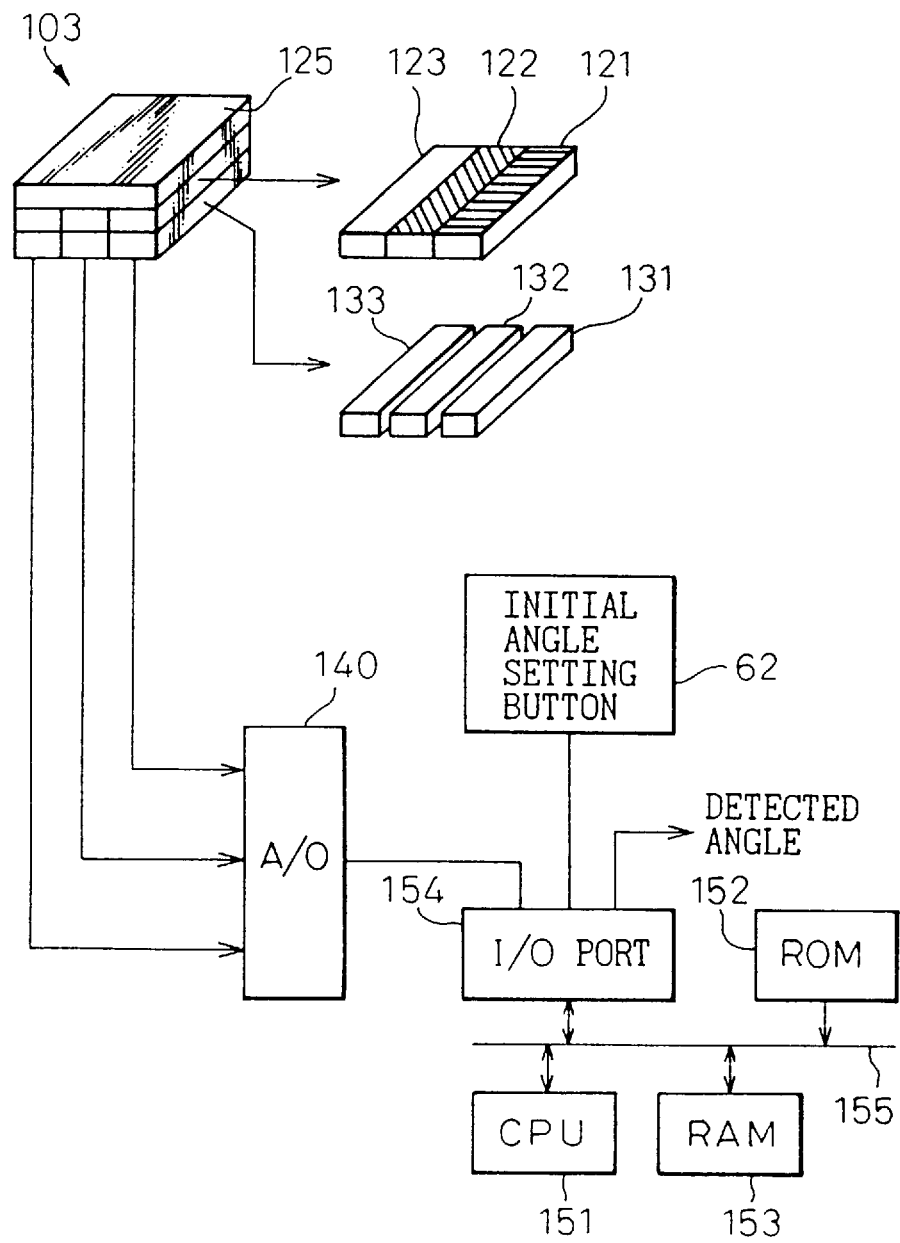
FIG. 6 shows a configuration including a light reception unit in the first embodiment.

FIG. 6 shows a configuration including the light reception unit 103.

In FIG. 6, there are shown polarization filters 121 and 122 arranged so that the polarizing directions thereof differ from each other by 45°, a transparent glass 123, light-receiving devices 131 to 133, a color filter 125 for passing light whose wavelength is close to the wavelength of light emanating from the LED 121, an A/D converter 140 for converting analog output signals sent from the light-receiving devices 131 to 133 to digital signals, a CPU 151, a ROM 152, a RAM 153, an I/O port 154, and a bus 155. The CPU 151, ROM 152, RAM 153, I/O port 154, and bus 155 constitute a computer, and process output signals of the light-receiving devices 131 to 133 which have been converted by the A/D converter 140. The output terminal of the initial angle setting button switch 62 shown in FIG. 4 is connected to the I/O port 154. The angle register 52 shown in FIG. 2A is installed in the computer.

The light-receiving devices 131 to 133 are located immediately below the polarization filters 121 and 122, and transparent glass 123 respectively, and detect light passing through them. The polarizing directions of the polarization filters 121 and 122 differ from each other by 45°. When an angle of light emanating from the light source unit 113 with respect to the polarizing direction of light changes, the outputs of the light-receiving devices 131 and 132 vary as indicated by the waveforms P and Q in FIG. 2A. A table in which the signal strengths P and Q are listed in association with angles of rotation is stored in the ROM 152 or RAM 153. The computer allows the A/D converter 140 to convert the output signals of the light-receiving devices 131 and 132 into digital signals, and reads the digital signals. The computer then references the table to obtain an angle associated with the signal strengths.

In the first embodiment, various measures are taken in an effort to improve detecting precision. The measures will be described below.

Figure 7A:
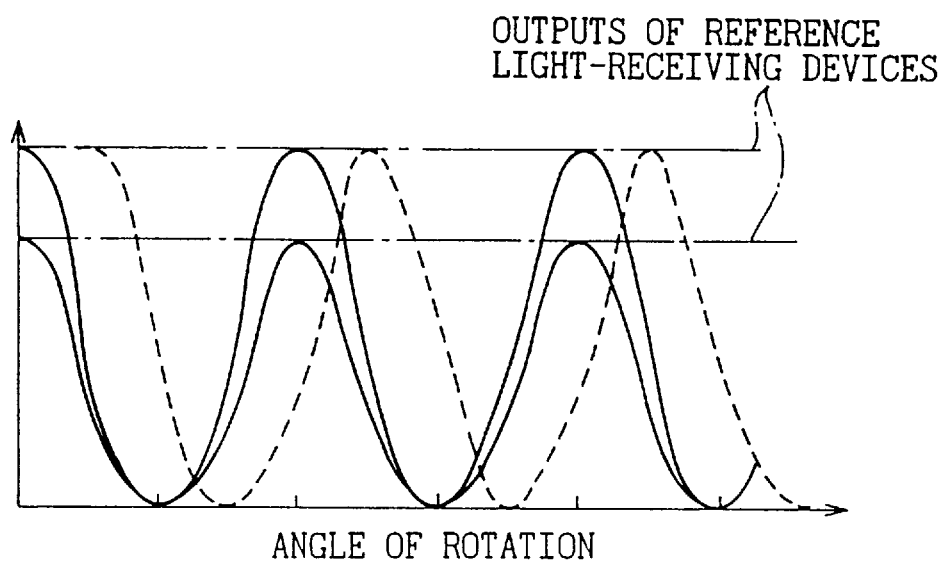
FIGS. 7A and 7B are diagrams for explaining signal processing in the first embodiment.
Figure 7B:
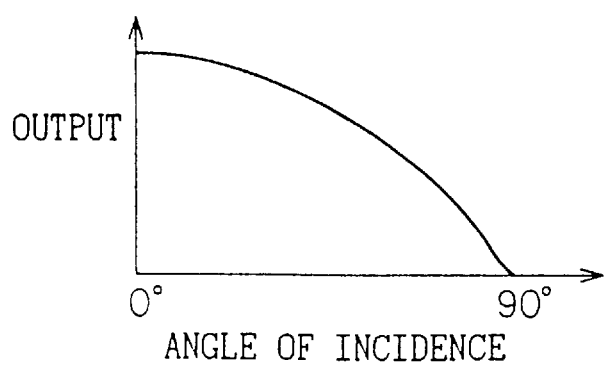

FIGS. 7A and 7B are diagrams for explaining the influence of the tilt of the light reception side of the light reception unit.

As shown in FIG. 7B, when an angle of incidence with respect to the light reception side of the light reception unit, that is, the light reception sides of the light-receiving devices 131 to 133 through which polarized light is received changes, even if the other states including an angle of rotation remain unchanged, the outputs of the light-receiving devices 131 to 133 vary. In this embodiment, an angle of rotation is calculated on the basis of a combination of strengths of signals output from the light-receiving devices 131 and 132. For calculating an angle of rotation accurately, not only a ratio of the angle of rotation to signal strengths but also the absolute values of signal strengths are important. Only the transparent glass 123 is placed in front of the light-receiving device 133, but no polarization filter is placed. The output of the light-receiving device 133 is therefore unaffected by an angle of rotation but varies depending on an angle of incidence. In this embodiment, therefore, the outputs of the light-receiving devices 131 and 132 are normalized relative to the output of the light-receiving device 133. Thus, the influence of a change in angle of incidence is eliminated. Specifically, when an angle of rotation is changed, the maximum strengths of the outputs of the light-receiving devices 131 and 132 agree with each other, and the output of the light-receiving device 133 is set to have the same maximum strength. The strengths of the outputs of the light-receiving devices 131 and 132 are then divided by the strength of the output of the light-receiving device 133. Consequently, the influence of a change in angle of incidence can be eliminated.

When an angle of incidence becomes too large, the foregoing correction is hardly carried out. In a virtual reality providing system, especially, in a rehabilitation virtual reality providing system, it will not take place that a head-mounted display tilts greatly to increase an angle of incidence largely. From this viewpoint, the foregoing correction is practical.

Figure 8:
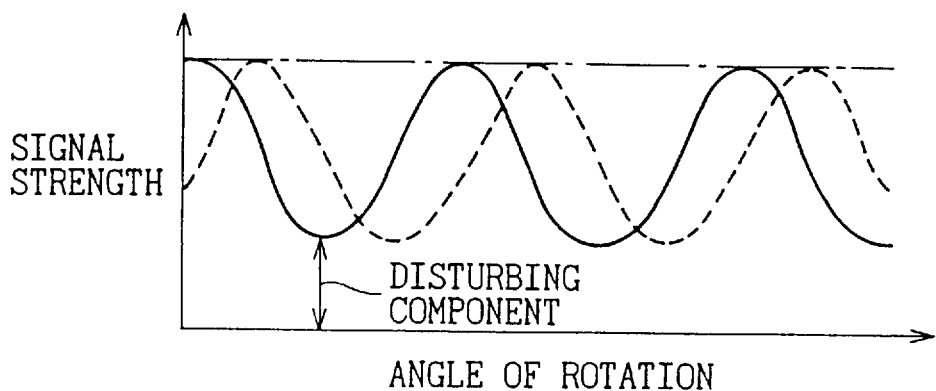
FIG. 8 is a diagram for explaining the influence of disturbing light.

FIG. 8 is a diagram for explaining the influence of disturbing light.

In the system configuration shown in FIG. 4, the light-interceptive curtain 115 is included to alleviate the influence of disturbing light. Thus, the influence of disturbing light can be alleviated markedly. When the light-interceptive curtain 115 cannot be made very long or cannot be installed for the reason of maneuverability of the system, the influence of disturbing light becomes significant. The disturbing light is light falling on the light reception unit 103 from the surroundings of the patient 100 in the state shown in FIG. 4. The disturbing light can be thought to be constant over a long period of time. When the LEDs 121 in the light source unit 113 are lit with an alternating current, the outputs of the light-receiving devices 131 to 133 vary as shown in FIG. 8. The disturbing component of an output is a bias, the strength of the output increases by that of the bias component.

Figure 9:
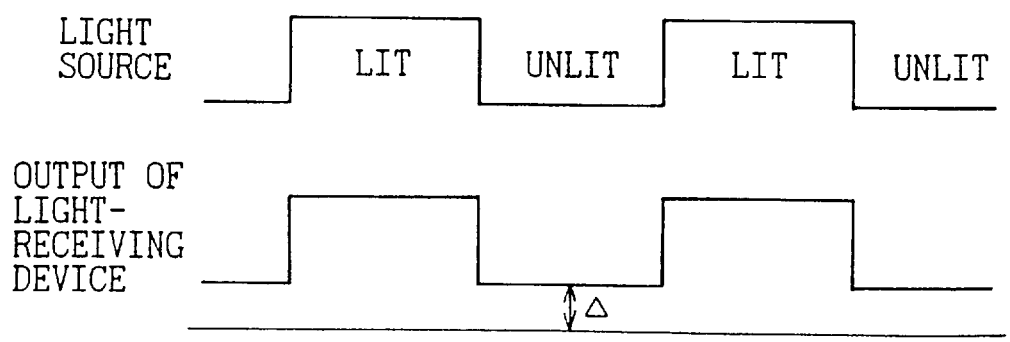
FIG. 9 is a diagram for explaining the processing of eliminating the influence of disturbing light.

FIG. 9 illustrates the processing for eliminating the influence of disturbing light in this embodiment.

As shown in FIG. 9, the LEDs 121 in the light source unit 113 are lit intermittently. When the LEDs 121 are unlit, the outputs A of the light-receiving devices are disturbing light components. The LEDs 121 are therefore lit intermittently. The outputs A of the light-receiving devices provided when the LEDs are unlit are regarded as disturbing light components. The disturbing light components are subtracted from the outputs of the light-receiving devices provided when the LEDs 121 are lit. Thus, the disturbing light components are eliminated.

FIGS. 10A and 10B are flowcharts describing the processing for detecting an angle of rotation in this embodiment.

At step 901, the control unit 70 prompts the patient 100 to face in a specified direction and press the initial angle setting button switch 62. At step 902, it is checked if the button switch 62 has been pressed. If the button switch has been pressed, control is passed to step 903.

At step 903, it is indicated that initial setting is in progress and that the direction should not be changed. At step 904, flag A is reset to zero. At step 905, an initial set value of an angle of rotation, for example, zero is set in the angle register.

At step 906, the LEDs 121 constituting the light source are put out.

At step 907, the output of the reference light-receiving device 133 is read, and a half of the output is regarded as a disturbing component. This is attributable to the fact that the employment of a polarization filter halves the output of a light-receiving device provided relative to the input light that is not polarized.

At step 908, the LEDs 121 constituting the light source are lit. At step 909, the outputs of the sensors are read.

At step 910, the output of the reference light-receiving device 133 is halved, and the disturbing component is subtracted from the resultant output in order to obtain a reference amount of light.

At step 911, the disturbing component is subtracted from the outputs of the light-receiving devices 131 and 132, and the resultant outputs are divided by the reference amount of light. Thus, normalization is carried out. The strengths of the resultant outputs are regarded as first and second detected strengths.

At step 912, the stored table is referenced to obtain an angle associated with the first and second detected strengths. In this case, two associated angles are obtained.

At step 913, one of the obtained angles which is close to the initial set value of an angle of rotation stored in the angle register, that is, which is set at step 905 is regarded as a detected angle. The detected angle is output as a result of detection, and is stored in the angle register in order to update the contents of the angle register. Meanwhile, initial setting is in progress. The patient 100 faces a direction close to a given initial direction. An angle of rotation at that time can therefore be determined.

At step 914, it is judged whether or not flag A represents zero. Since the processing performed so far is intended for initial setting. Since flag A represents zero, control is passed to step 915. Flag A is then set to 1.

At step 916, it is indicated that initial setting is completed and that rehabilitation is started.

Thus, initial setting is completed, and it is started to provide virtual reality for rehabilitation. Control is then returned to step 906.

After rehabilitation is started, the processing of step 906 and thereafter is the same as the aforesaid one. The immediately-previous angle of rotation stored in the angle register is updated continually according to the patient's movement. At step 914, since flag A is set to 1, the processing from step 906 to 914 is repeated. A calculated detected angle is output continually.

In the foregoing example, a disturbing component is calculated using the output of the light-receiving device 133. Alternatively, the disturbing component may be calculated using the output of the light-receiving device 131 or 132. When the influence of disturbing light can be nearly ignored owing to the light-interceptive curtain 115 or the like, an angle of rotation can be calculated without calculation of a disturbing component and execution of the elimination process.

Figure 11:
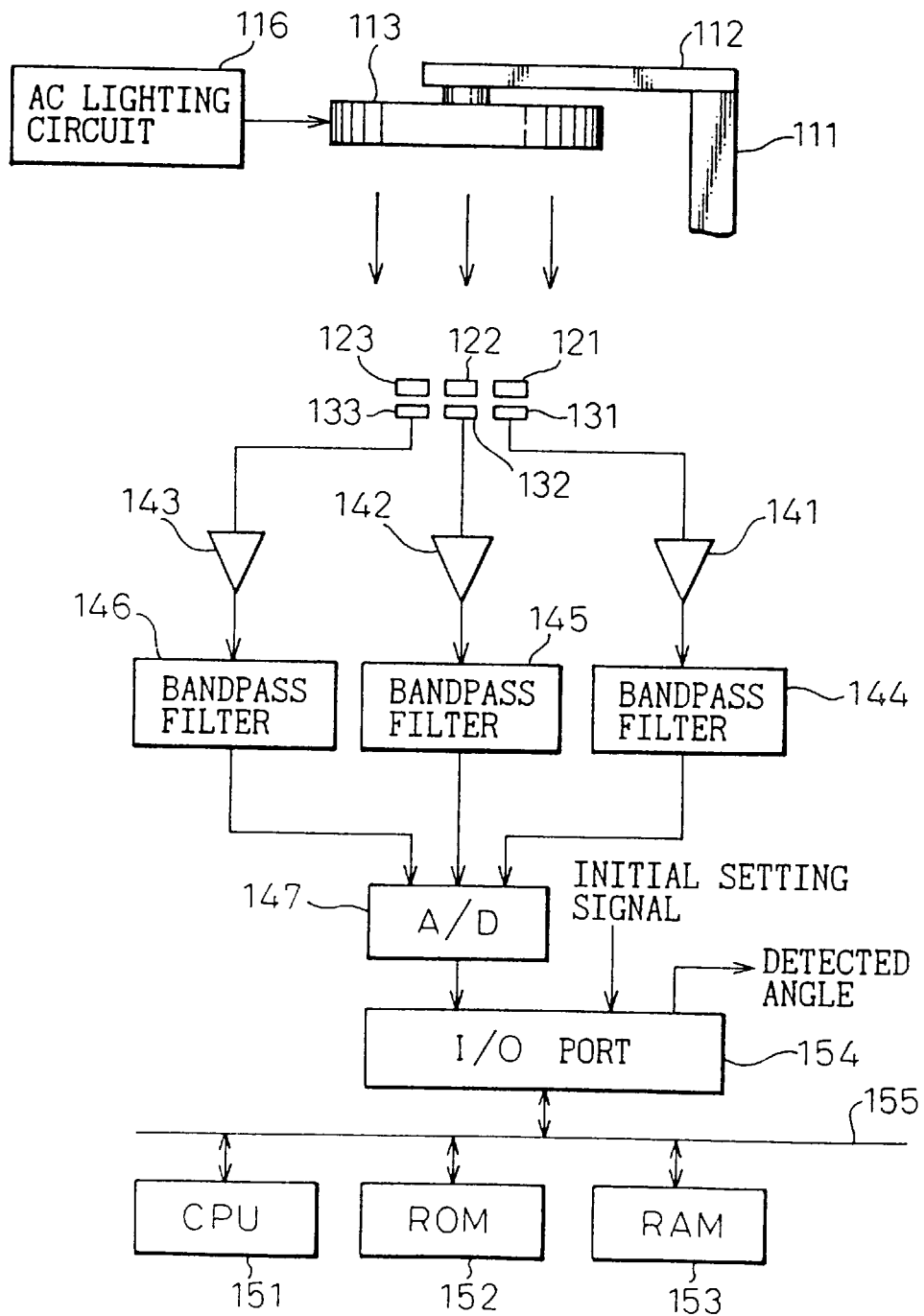
FIG. 11 is a diagram for explaining another processing for eliminating the influence of disturbing light.

In the aforesaid example, the light source is lit intermittently. A disturbing component is calculated using the output of the reference light-receiving device 133 provided when the light source is unlit, and then subtracted from the outputs of the light-receiving devices provided when the light source is lit. A method of directly removing a disturbing component will also do. FIG. 11 shows a configuration including the light reception unit 103 designed to directly remove a disturbing component.

Differences from the configuration shown in FIG. 6 lie in that: the LEDs 121 in the light source unit 113 are lit with an alternating current (AC) by an AC lighting circuit 116; and the outputs of the light-receiving devices 131 to 133 are filtered by bandpass filters 144 to 146 that pass a signal whose frequency is close to the frequency at which the alternating current alternates. Consequently, a disturbing component that is a direct current (DC) signal is removed from the outputs of the light-receiving devices 131 to 133.

Figure 12:
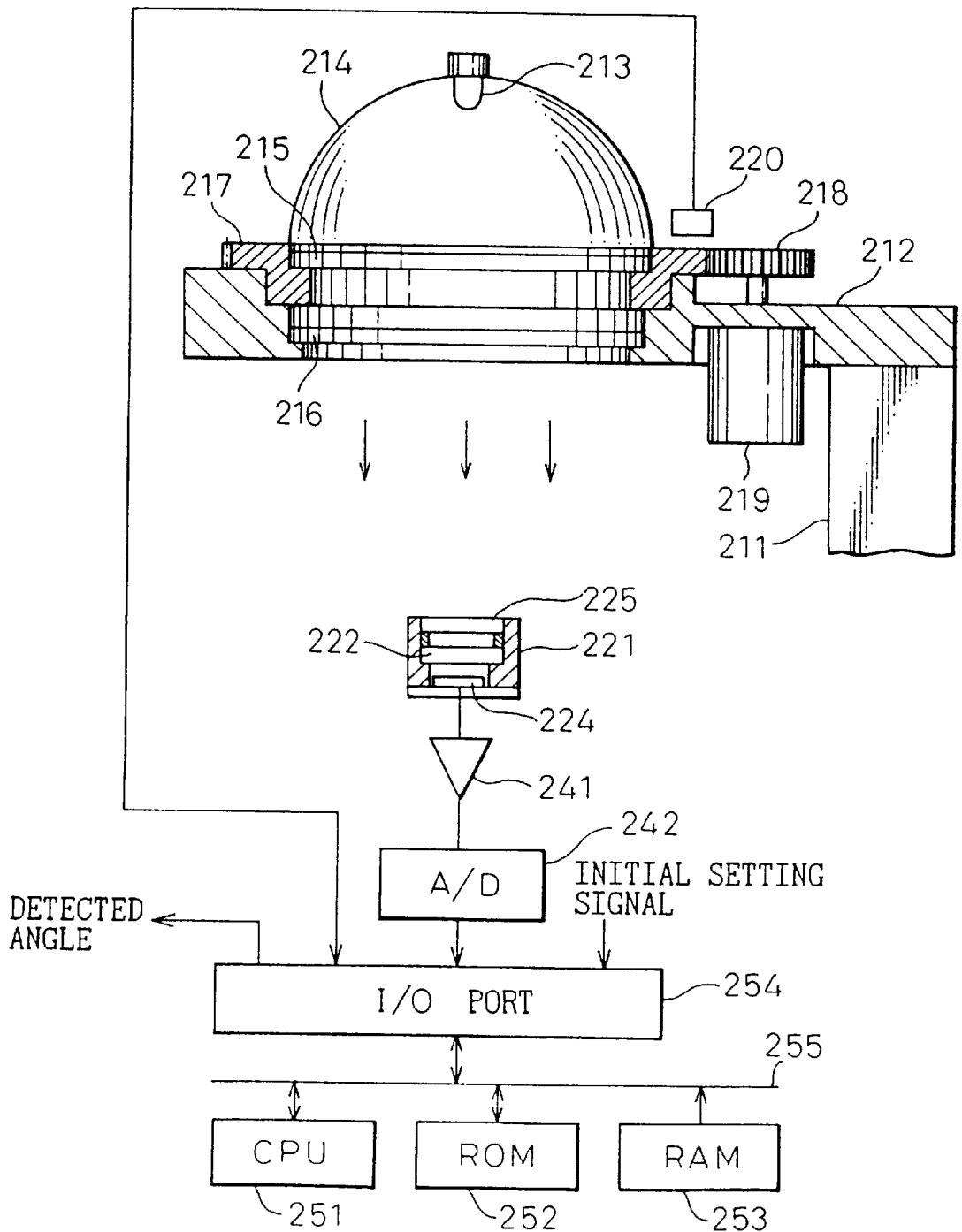
FIG. 12 shows the configuration of the second embodiment.

FIG. 12 shows the configuration of the second embodiment. The second embodiment also relates to a virtual reality providing system shown in FIG. 4. only the components involved in a relative angle detecting system are shown in FIG. 12. The second embodiment is an embodiment in accordance with another aspect of the present invention illustrated in FIG. 3A.

Differences from the first embodiment lie in that: one electric lamp providing a large amount of output light is used as a light source 213 in a light source unit and a reflecting mirror 214 is used to radiate light, which is uniform in a wide range, downward; a large polarization filter 215 that is large enough to cover a detection range is used; a color filter 216 is included in the light source unit; and a polarization filter 215 rotates at intervals of a given cycle by means of a motor 219 and rotation mechanisms 217 and 218. A light reception unit 221 includes one polarization filter 222 and one light-receiving device 224. The rotating position of the polarization filter 215 is detected by a sensor 220, and sampled by a computer through an I/O port 254.

Figure 13A:
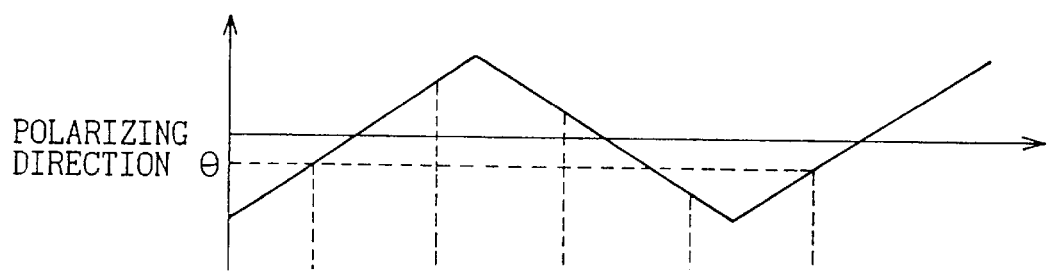
FIGS. 13A and 13B illustrate processing in the second embodiment.
Figure 13B:
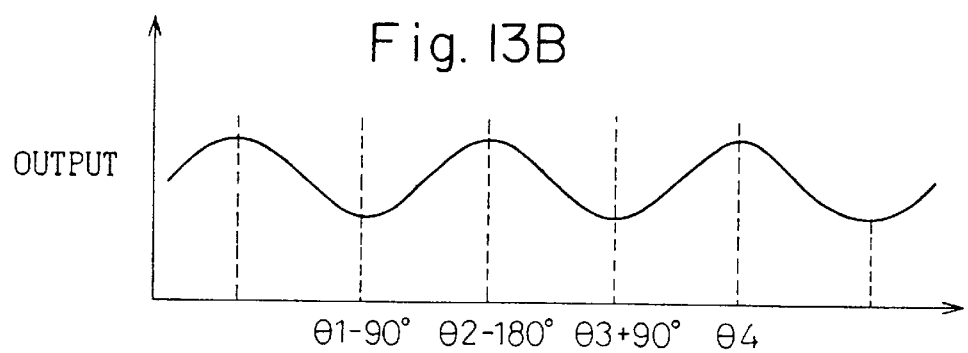

FIGS. 13A and 13B are is a diagram for explaining signal processing in the second embodiment.

While the polarization filter 215 in the light source unit rotates by one turn, the polarizing direction of the polarization filter 215 becomes coincident with the polarizing direction of the polarization filter 222 in the light reception unit 221 at two angles at which the polarization filter 215 is set. When the polarizing directions coincide with each other, the output of the light-receiving device 224 has a maximum strength. The angle of rotation of the polarization filter 215 is detected by the sensor 220 and sampled by the computer. The angle of rotation is therefore detectable. Consequently, when the output of the light-receiving device 224 has the maximum strength, if the angle of rotation of the polarization filter 215 is detected, the angle of rotation of the light reception unit 221 can be detected.

Figure 14A:
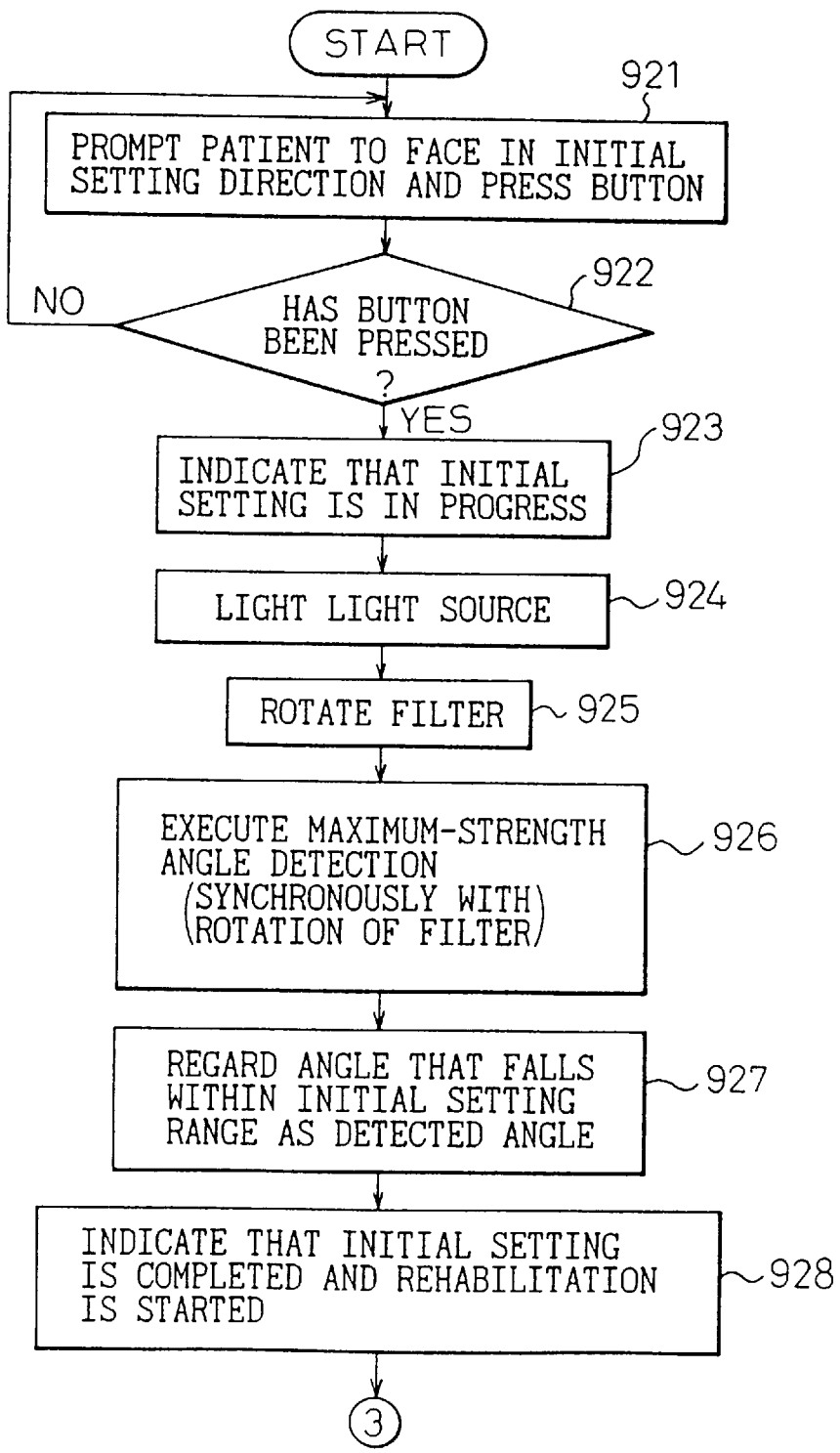
FIGS. 14A and 14B are flowcharts describing processing in the second embodiment.
Figure 14B:
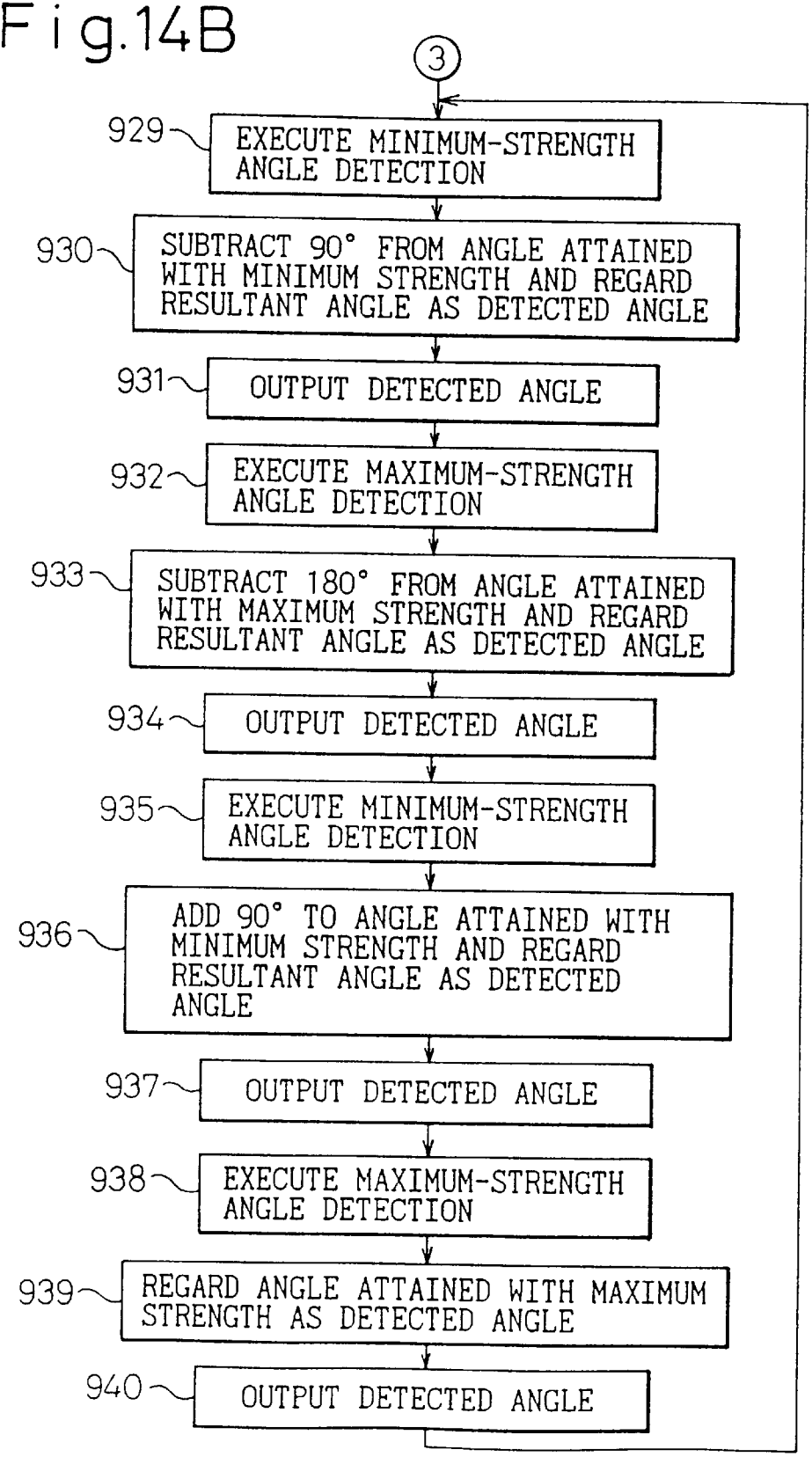

FIGS. 14A and 14B are flowcharts describing processing in the second embodiment.

The operations from step 921 to 924 are identical to those described in conjunction with FIG. 10. The description of the operations will therefore be omitted.

At step 925, it is started to rotate the polarization filter 215. The angle of rotation shall change from −180° to +180°, and shell return from +180° to −180°.

At step 926, maximum-strength angle detection is executed synchronously with rotation of the polarization filter 215 in order to detect the angles of rotation of the polarization filter 215 attained when the output of the light-receiving device 224 has a maximum strength. The details of maximum-strength angle detection will be described later.

At step 927, one of the angles of rotation attained with the maximum strength which are detected at step 926, which falls within an initial setting range, is regarded as a detected angle. Maximum-strength angle detection provides two angles that differ from each other by 180°. When a patient faces in a given direction, one of the angles can be selected readily.

At step 928, it is indicated that initial setting is completed and rehabilitation is started.

At step 929, minimum-strength angle detection which will be described later is executed in order to detect an angle of rotation attained with a minimum strength. As long as the time interval between steps 927 and 929 is sufficiently short, even if the patient changes his/her orientation during the interval, the angle of rotation will not become an angle minimizing the output of the light-receiving device 224, that is, will not be changed by approximately 90°. At step 930, therefore, an angle obtained by subtracting 90° from a detected angle of rotation is regarded as a detected angle. At step 931, the angle is output as a result of detection.

At step 932, maximum-strength angle detection is executed. At step 933, 180° is subtracted from an angle attained with the maximum strength and a resultant angle is regarded as a detected angle. At step 934, the detected angle is output.

At step 935, minimum-strength angle detection is executed. At step 936, 90° is added to an angle attained with the minimum strength, and a resultant angle is regarded as a detected angle. At step 937, the detected angle is output.

At step 938, maximum-strength angle detection is executed. At step 939, an angle attained with the maximum strength is regarded as a detected angle. At step 940, the detected angle is output. Control is then returned to step 929.

Figure 15:
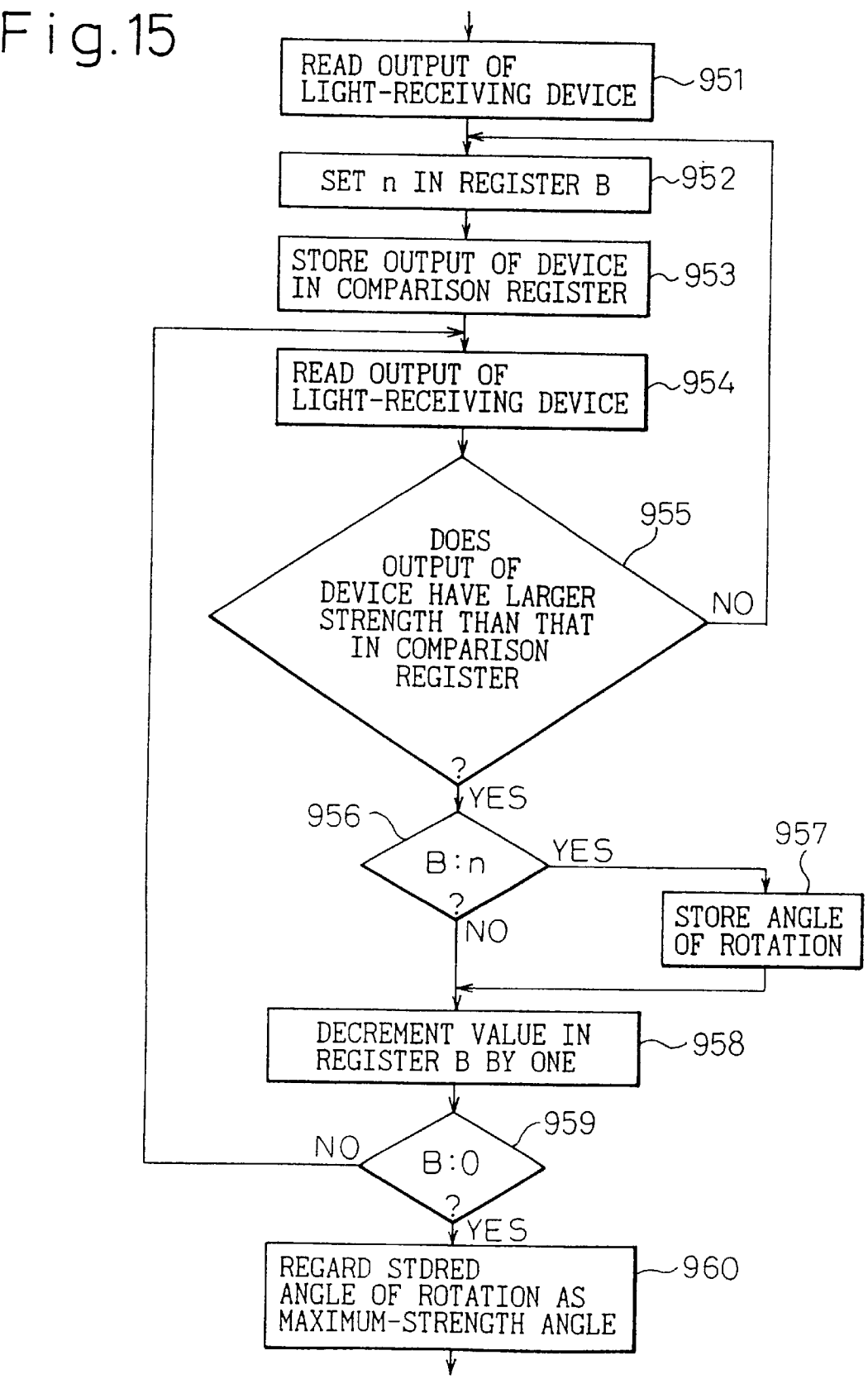
FIG. 15 is a flowchart describing part of processing in the second embodiment.

FIG. 15 is a flowchart describing maximum-strength angle detection.

At step 951, the output of the light-receiving device is read. At step 952, a positive integer n is set in register B. At step 953, the read output of the light-receiving device is stored in a comparison register.

At step 954, the output of the light-receiving device is read. At step 955, the read output is compared with the one stored in the comparison register. If the newly-detected output has a larger strength, control is returned to step 952. Thus, when the strength of the output increases, the output stored in the comparison register is replaced continually with a newly-read output. If the output in the comparison register has a larger strength, control is passed to step 956.

At step 956, it is judged whether or not the value in register B is n. If the value is n, the output in the comparison register has a larger strength, and the strength may be a maximum strength. Control is then passed to step 957, and an angle of rotation at that time is stored. Control is then passed to step 958. If the value is not n, since it is the second time of detection or later after the strength of the output starts decreasing, control is passed to step 958.

At step 958, the value in register B is decremented by one.

At step 959, it is judged whether or not the value in register B is zero. If the value is not zero, control is returned to step 954. If the value is zero, control is passed to step 960. Thus, an angle of rotation attained first after the strength of the output starts decreasing from the maximum strength is stored. When it is detected continually n times that the strength of the output has decreased, the maximum strength is identified. Even if any detected strength has a reverse value due to noises or the like, the maximum strength can be identified accurately.

At step 960, the angle of rotation stored at step 957 is output as a maximum-strength angle.

The processing for detecting an angle of rotation attained with the maximum strength has been described so far. The same applies to detection of an angle of rotation attained with the minimum strength. In this case, comparison is carried out in an opposite direction.

Owing to the processing described in FIGS. 14A, 14B and 15, for example, when an angle of rotation changes slowly in one direction, an angle of rotation detected by repeating steps 929 to 940 changes in the one direction gradually. Even if the angle of rotation changes to exceed +180°, it can be detected. This leads to an expanded range of detectable angles. According to the processing described in FIG. 14, while the polarization filter 215 in the light source unit rotates by one turn, four angles of rotation attained with the maximum value and minimum value are detected. If a patient changes his/her orientation very slowly for the cycle of rotation of the polarization filter 215, it may not be necessary to perform detection four times during one turn. In this case, angles attained with one of the maximum and minimum values may be detected.

In the first and second embodiments, for initial setting, a patient is asked to face in a given direction, and then an initial direction is determined. The angle of the direction is regarded as a start angle. Consequently, an angle of rotation falling beyond a range from 0° to +180° (−90° to +90°) can be detected. However, when the patient changes his/her orientation within the range from 0° to +180° (−90° to +90°), an angle of rotation can be detected without initial setting. An embodiment in which the configuration of the second embodiment is adapted for detection under this condition will be presented as the third embodiment.

FIGS. 16A and 16B are a diagram for explaining processing in the third embodiment.

After rotating 180°, a polarization filter returns to the original state. The polarization filter 215 in the light source unit rotates by an angle ranging from −90° to +90°. Assuming that an angle of rotation attained with a maximum strength is θ, an angle of rotation attained with a minimum strength falls within a range of θ±90°. When the θ value is negative, the angle of rotation is θ+90°. When the θ value is positive, the angle of rotation is θ−90°. When an angle of rotation attained with the minimum strength is calculated, ±90° of the calculated angle are calculated. One of the angles closer to the maximum-strength angle θ is regarded as a detected angle. In other words, since a patient changes his/her orientation only by an angle ranging from −90° to +90°, an angle falling within the range is regarded as a detected angle.

Figure 17:
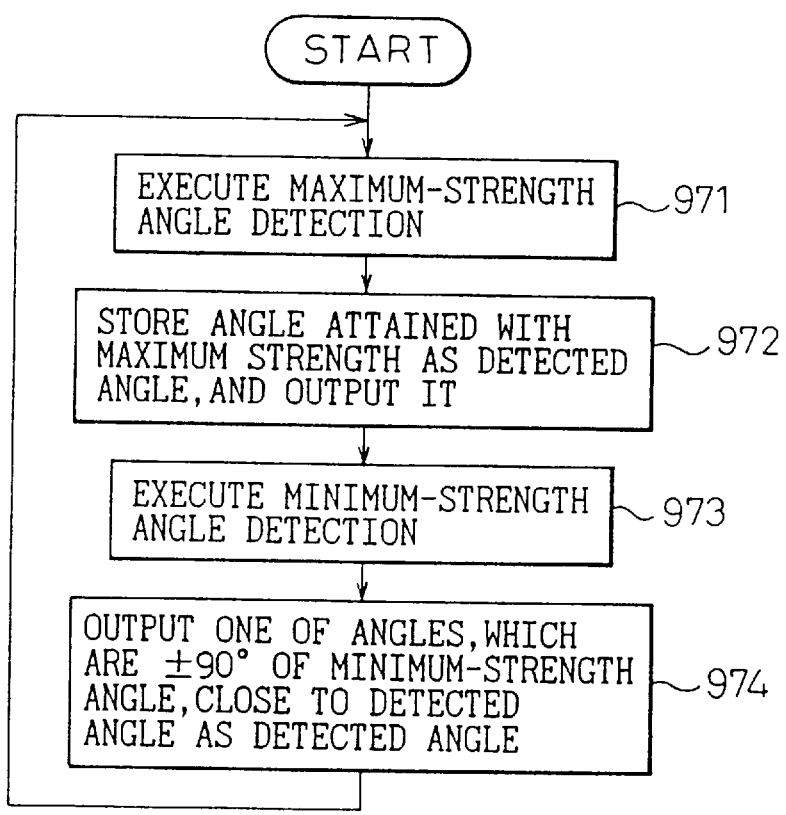
FIG. 17 is a flowchart describing processing in the third embodiment.

FIG. 17 is a flowchart describing processing in the third embodiment.

At step 971, maximum-strength angle detection described in FIG. 15 is executed in order to detect an angle of rotation that is attained with the maximum strength and falls within the range from −90° to +90°.

At step 972, an angle of rotation attained with the maximum strength, which is detected at step 971, is stored and output as a detected angle.

At step 973, minimum-strength angle detection is executed, and an angle of rotation attained with the minimum strength is detected.

At step 974, ±90° of the angle of rotation attained with the minimum strength, which is detected at step 973, are calculated. One of the angles closer to the detected angle stored at step 972 is then output. Control is then returned to step 971.

In the second and third embodiments, an angle of rotation attained with a maximum or minimum strength is detected through the processing described in FIG. 15. However, there is a problem that: when the polarizing direction of light emanating from a light source unit changes, the output of a light-receiving device having a strength close to the maximum or minimum strength varies moderately; it is therefore hard to detect a time instant at which the maximum or minimum strength is attained; and a large error ensues. In the fourth embodiment, an angle of rotation is detected at a time instant at which a variation of the output of a light-receiving device is maximized, that is, the output thereof has a strength between the maximum and minimum strengths.

Figure 18:
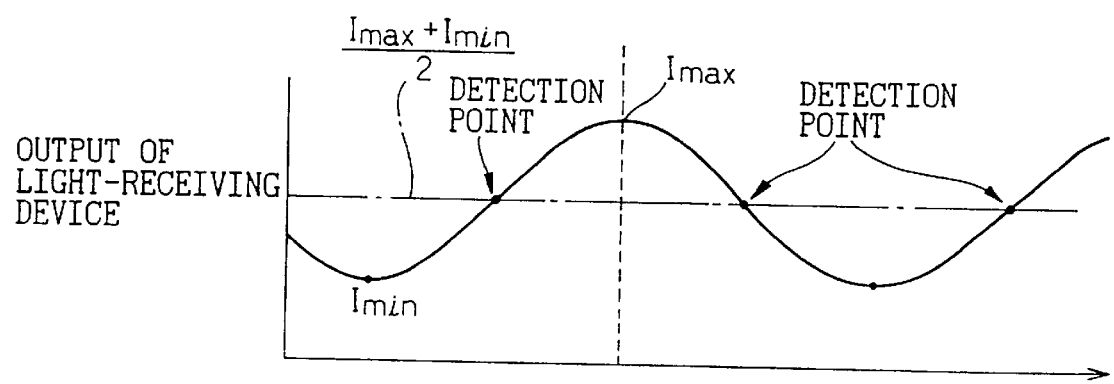
FIG. 18 illustrates processing in the fourth embodiment.

FIG. 18 is a diagram for explaining processing in the fourth embodiment.

The output of a light-receiving device varies as illustrated along with the rotation thereof in the polarizing direction of light emanating from a light source unit. Assuming that a maximum strength is Imax and a minimum strength is Imin, an intermediate strength is expressed as (Imax+Imin)/2. A time instant at which the output of the light-receiving device has the intermediate strength is detected. Angles of rotation attained with the intermediate strength are ±45° or ±135° of an angle attained with the maximum strength. As described previously, the maximum and minimum strengths may fluctuate for various reasons. An intermediate strength is therefore calculated using the maximum and minimum strengths obtained immediately previously.

Figure 19B:
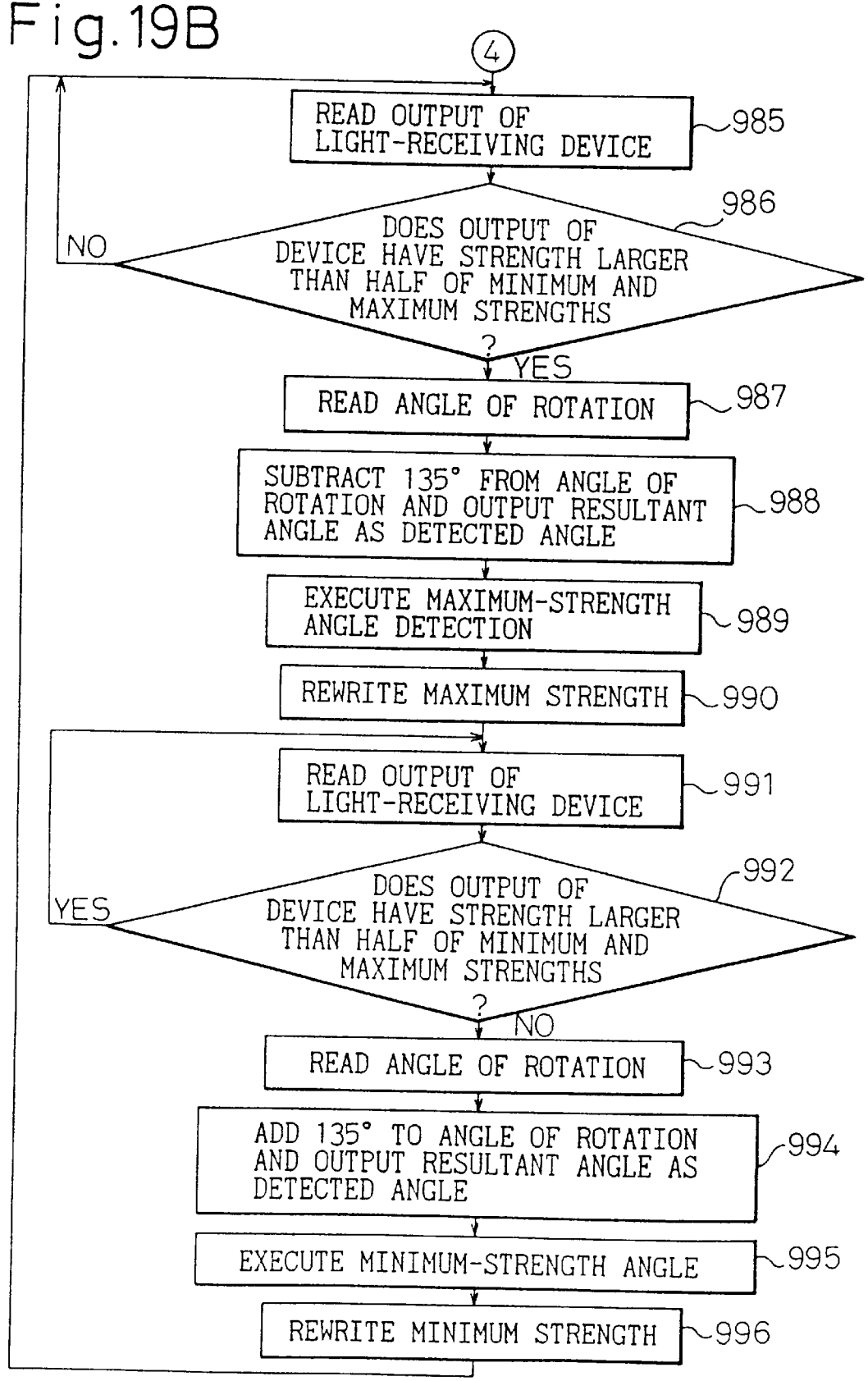

FIGS. 19A and 19B are flowcharts describing processing in the fourth embodiment. Herein, the processing is fundamentally identical to the processing in the second embodiment described in FIGS. 14A and 14B. The only difference lies in that an angle of rotation to be detected is an angle attained with an intermediate strength.

Steps 976 to 979 are identical to those in the second or third embodiment. At steps 980 to 983, an angle attained with a maximum strength and an angle attained with a minimum strength are detected and stored consecutively through the processing described in FIG. 15. For initial setting, an angle of rotation attained with the maximum strength shall be zero. At step 984, it is indicated that initial setting is completed and rehabilitation is started.

At step 985, the output of the light-receiving device is read. At step 986, it is judged whether or not the read output has a strength larger than the intermediate strength. At step 983, a time instant at which the output has the minimum strength is detected. If the time interval from steps 983 to 985 is sufficiently short, the strength will not exceed the intermediate strength during the time interval. A time instant at which the strength of the output of the light-receiving device exceeds the intermediate strength is therefore detected. When the strength of the output exceeds the intermediate strength, control is passed to step 987.

At step 987, an angle of rotation is read. At step 988, 135° is subtracted from the angle of rotation, and a resultant angle is output as a detected angle.

At step 989, a maximum strength is detected. At steps 985 and 986, a time instant at which the intermediate strength of the minimum and maximum strengths is detected. After step 986, therefore, the maximum strength is attained without fail. At step 990, the detected strength is substituted for the stored maximum strength in order to update the maximum strength. Thus, an immediately preceding maximum strength is used to calculate an intermediate strength.

At steps 991 to 996, by reversing the operations of steps 985 to 990, an angle of rotation attained with the intermediate strength of the maximum and minimum strengths is detected, and the minimum strength is updated. After step 996, control is returned to step 985. The foregoing operations are repeated.

As described so far, according to the present invention, a part to be attached to a part whose angle of rotation is to be detected can be made compact and lightweight. Consequently, a relative angle detecting system permitting a large range of detectable angles can be realized. When the relative angle detecting system is adapted to a virtual reality providing system, images giving greater reality and matching a user's movement can be provided readily.

What is claimed is:

1. A relative angle detecting system for detecting an angle of rotation of a mounted unit with respect to a given initial direction on a given plane, comprising:

a light source unit, separated from said unit, for radiating polarized light, of which polarizing direction is defined with respect to said given initial direction, in a direction substantially perpendicular to said given plane;

a light reception unit being united with said unit and including a first polarization filter for receiving light emanating from said light source unit, a second polarization filter adjoining said first polarization filter on the same plane so as to receive light emanating from said light source unit, and having a polarizing direction that is different by an angle other than 90° from the polarizing direction of said first polarization filter, a first light-receiving device for receiving light that emanates from said light source unit and passes through said first polarization filter, and a second light-receiving device for receiving light that emanates from said light source unit and passes through said second polarization filter; and an arithmetic means for calculating the relative angle of said unit with respect to said given initial direction on the basis of the combination of strengths of signals output from said first light-receiving device and second light-receiving device.

2. A relative angle detecting system according to claim 1, wherein said arithmetic means includes a two outputs-vs.-angle table in which strengths of signals output from said first light-receiving device and second light-receiving device are stored in association with changed relative angles of said unit with respect to the polarizing direction of light emanating from said light source unit.

3. A relative angle detecting system according to claim 1, further comprising an initial angle setting means for indicating that said unit lies within a given angle of initial angles with respect to the polarizing direction of light emanating from said light source unit, wherein: said arithmetic means includes an angle register for storing a relative angle detected immediately previously; when it is indicated that said unit lies within said range of initial angles, said arithmetic means calculates the relative angle of said unit, and stores a relative angle of calculated relative angles, which satisfies the condition that said unit lies within said range of initial angles, in said angle register; for a relative angle detecting operation, a relative angle of calculated relative angles, which is closest to the relative angle stored in said angle register, is output as a detected angle and stored in said angle register in order to update the contents of said angle register.

4. A relative angle detecting system according to claim 1, wherein: said light reception unit includes a reference light-receiving device located in the vicinity of said first and second light-receiving devices; and said arithmetic means normalizes the outputs of said first and second light-receiving devices relative to the output of said reference light-receiving device, and then calculates a relative angle.

5. A relative angle detecting system according to claim 1, wherein: said light source unit radiates polarized light intermittently; and said arithmetic means regards the outputs of said first and second light-receiving devices, which are provided when said light source unit does not radiate polarized light, as disturbing components, and calculates a relative angle on the basis of strengths of signals obtained by subtracting said disturbing components from the outputs of said first and second light-receiving devices provided when said light source unit radiates polarized light.

6. A relative angle detecting system according to claim 4, wherein: said light source unit radiates polarized light intermittently; and said arithmetic means regards a half of the output of said reference light-receiving device, which is provided when said light source unit does not radiate polarized light, as a disturbing component, and calculates a relative angle on the basis of strengths of signals obtained by subtracting said disturbing component from the outputs of said first and second light-receiving devices provided when said light source unit radiates polarized light.

7. A relative angle detecting system according to claim 1, wherein: said light source unit changes the intensity of polarized light emanating from said light source unit at intervals of a given cycle; said relative angle detecting system further comprises bandpass filters for passing only the components of the output signals of said first and second light-receiving devices, of which the cycles are close to said given cycle; and said arithmetic means calculates a relative angle on the basis of signals passing through said bandpass filters.

8. A relative angle detecting system according to claim 4, wherein: said light source unit changes the intensity of polarized light emanating from said light source unit at intervals of a given cycle; said relative angle detecting system further comprises bandpass filters for passing only the components of the output signals of said first and second light-receiving devices and said reference light-receiving device, of which cycles are close to said given cycle; and said arithmetic means calculates a relative angle on the basis of signals passing through said bandpass filters.

9. A relative angle detecting system according to claim 1, wherein said light source unit includes a light source and a polarization filter for transmitting light emanating from said light source.

10. A relative angle detecting system according to claim 1, wherein: said light source unit includes a plurality of irradiation assemblies arranged on a planar basis; said irradiation assemblies each include a light source and a polarization filter for passing light emanating from said light source, and are arranged so that polarized light rays emanating from the adjoining irradiation assemblies mutually overlap at a position at which said light reception unit is located.

11. A relative angle detecting system according to claim 10, wherein said light source is an LED.

12. A relative angle detecting system according to claim 11, wherein said light reception unit includes a color filter for passing light whose wavelength is close to that of light emanating from said LED.

13. A relative angle detecting system for detecting an angle of rotation of a mounted unit with respect to a given initial direction on a given plane, comprising:

a light source unit, separated from said unit, for radiating polarized light, of which polarizing direction changes at intervals of a given cycle, in a direction substantially perpendicular to said given plane;

a light reception unit being united with said unit and including a polarization filter for receiving light emanating from said light source unit and a light-receiving device for receiving light that emanates from said light source unit and passes through said polarization filter; and an arithmetic means for calculating the relative angle of said unit with respect to said given initial direction on the basis of the polarizing direction of light emanating from said light source unit at a time instant at which a signal output from said light-receiving device has a given strength.

14. A relative angle detecting system according to claim 13, wherein said arithmetic means calculates the relative angle of said unit with respect to said given initial direction on the basis of the polarizing direction of light emanating from said light source unit at a time instant at which a signal output from said light-receiving device has a maximum strength.

15. A relative angle detecting system according to claim 13, wherein said arithmetic means calculates the relative angle of said unit with respect to said given initial direction on the basis of the polarizing direction of light emanating from said light source unit at a time instant at which a signal output from said light-receiving device has a minimum strength.

16. A relative angle detecting system according to claim 13, wherein said arithmetic means calculates the relative angle of said unit with respect to said given initial direction on the basis of the polarizing directions of light emanating from said light source unit at time instants at which a signal output from said light-receiving device has maximum and minimum strengths.

17. A relative angle detecting system according to claim 13, wherein said arithmetic means calculates the relative angle of said unit with respect to said given initial direction on the basis of the polarizing direction of light emanating from said light source unit at a time instant at which a signal output from said light-receiving device has an intermediate strength of maximum and minimum strengths.

18. A relative angle detecting system according to claim 13, wherein said light source unit includes a light source, a polarization filter for transmitting light emanating from said light source, and rotating means for rotating said polarization filter.

19. A relative angle detecting system according to claim 13 further comprising an initial angle setting means for indicating that said unit lies within a given range of initial angles with respect to the polarizing direction of light emanating from said light source unit, wherein: said arithmetic means includes an angle register for storing a relative angle detected immediately previously; and when it is indicated that said unit lies in said given initial direction, said arithmetic means calculates the relative angle of said unit, stores a relative angle of calculated relative angles, which is close to an angle of said given initial direction, in said angle register; and for a relative angle detecting operation, said arithmetic means outputs a relative angle of calculated relative angles, which is closest to the relative angle stored in said angle register, as a detected angle, and stores the detected angle in said angle register so as to update the contents of said angle register.

20. A relative angle detecting system according to claim 13 further comprising an initial angle setting means for indicating that said unit lies in a given initial direction with respect to the polarizing direction of light emanating from said light source unit, wherein: when it is indicated that said unit lies in said given initial direction, said arithmetic means calculates the relative angle of said unit, and regards a relative angle of calculated relative angles, which is close to the angle of said given initial direction, as an initial angle; for a relative angle detecting operation, said arithmetic means regards said initial angle as a start angle, and calculates continually the relative angle of said unit with respect to said given initial direction on the basis of the polarizing direction of light emanating from said light source unit at a time instant at which a signal output from said light-receiving device has a given strength.

21. A relative angle detecting system according to claim 1 further comprising a light-interceptive means for minimizing the incidence of light other than polarized light emanating from said light source unit on said light reception unit.

22. A virtual reality providing system, comprising:

a head-mounted display being worn on a user's head and having an image display means for providing said user's eyes with images;

a control unit for producing images to be displayed on said image display means of said head-mounted display so that said user's eyes are provided with a three-dimensional image by differentiating the images according to a parallax;

a light source unit, located above said user's head, for radiating polarized light whose polarizing direction is defined with respect to a given initial direction;

a light reception unit being located on said head-mounted display and including a first polarization filter for receiving light emanating from said light source unit, a second polarization filter adjoining said first polarization filter on the same plane so as to receive light emanating from said light source unit, and having a polarizing direction different by an angle other than 90° from the polarizing direction of said first polarization filter, a first light-receiving device for receiving light that emanates from said light source unit and passes through said first polarization filter, and a second light-receiving device for receiving light that emanates from said light source unit and passes through said second polarization filter; and an arithmetic means for calculating the relative angle of said unit with respect to said given initial direction on the basis of the combination of strengths of signals output from said first light-receiving device and second light-receiving device, wherein said control unit varies images to be displayed on said image display means according to the relative angle of said head-mounted display on a plane perpendicular to the radiating direction of light emanating from said light source unit which is calculated by said arithmetic means.

23. A virtual reality providing system according to claim 22, further comprising an initial angle setting means for indicating that said unit lies within a given angle of initial angles with respect to the polarizing direction of light emanating from said light source unit, wherein: said arithmetic means includes an angle register for storing a relative angle detected immediately previously; when it is indicated that said unit lies within said range of initial angles, said arithmetic means calculates the relative angle of said unit, and stores a relative angle of calculated relative angles, which satisfies the condition that said unit lies within said range of initial angles, in said angle register; for a relative angle detecting operation, a relative angle of calculated relative angles, which is closest to the relative angle stored in said angle register, is output as a detected angle and stored in said angle register in order to update the contents of said angle register.

24. A virtual reality providing system according to claim 23, wherein said initial angle setting means is a button switch, and said user manipulates said button switch while facing in a given direction so as to indicate that he/she faces in said given initial direction.

25. A virtual reality providing system according to claim 22 further comprising a light-interceptive means for minimizing incidence of light other than polarized light emanating from said light source unit on said light reception unit.

26. A virtual reality providing system according to claim 25, wherein said light-interceptive means is a light-interceptive curtain which is hung on said light source unit so that the light-interceptive curtain can enclose a range of said user's movements.

27. A virtual reality providing system, comprising:

a head-mounted display being worn on a user's head and having an image display means for providing said user's eyes with images;

a control unit for producing images to be displayed on said image display means of said head-mounted display so that said user's eyes are provided with a three-dimensional image by differentiating the images according to a parallax;

a light source unit, located above said user's head, for radiating polarized light whose polarizing direction changes at intervals of a given cycle, in a direction substantially perpendicular to said given plane;

a light reception unit being united with said unit and including a polarization filter for receiving light emanating from said light source unit and a light-receiving device for receiving light that emanates from said light source unit and passes through said polarization filter; and an arithmetic means for calculating the relative angle of said unit with respect to said given initial direction on the basis of the polarizing direction of light emanating from said light source unit at a time instant at which a signal output from said light-receiving device has a given strength, wherein said control unit varies images to be displayed on said image display means according to the relative angle of said head-mounted display on a plane perpendicular to the radiating direction of light emanating from said light source unit which is calculated by said arithmetic means.

28. A virtual reality providing system according to claim 22, further comprising an initial angle setting means for indicating that said unit lies within a given range of initial angles with respect to the polarizing direction of light emanating from said light source unit, wherein: said arithmetic means includes an angle register for storing a relative angle detected immediately previously; and when it is indicated that said unit lies in said given initial direction, said arithmetic means calculates the relative angle of said unit, stores a relative angle of calculated relative angles, which is close to an angle of said given initial direction, in said angle register; and for a relative angle detecting operation, said arithmetic means outputs a relative angle of calculated relative angles, which is closest to the relative angle stored in said angle register, as a detected angle, and stores the detected angle in said angle register so as to update the contents of said angle register.

29. A virtual reality providing system according to claim 27, further comprising an initial angle setting means for indicating that said unit lies in a given initial direction with respect to the polarizing direction of light emanating from said light source unit, wherein: when it is indicated that said unit lies in said given initial direction, said arithmetic means calculates the relative angle of said unit, and regards a relative angle of calculated relative angles, which is close to the angle of said given initial direction, as an initial angle; for a relative angle detecting operation, said arithmetic means regards said initial angle as a start angle, and calculates continually the relative angle of said unit with respect to said given initial direction on the basis of the polarizing direction of light emanating from said light source unit at a time instant at which a signal output from said light-receiving device has a given strength.

30. A virtual reality providing system according to claim 28, wherein said initial angle setting means is a button switch, and said user manipulates said button switch while facing in a given direction so as to indicate that he/she faces in said given initial direction.

31. A virtual reality providing system according to claim 29, wherein said initial angle setting means is a button switch, and said user manipulates said button switch while facing in a given direction so as to indicate that he/she faces in said given initial direction.

32. A virtual reality providing system according to claim 27 further comprising a light-interceptive means for minimizing incidence of light other than polarized light emanating from said light source unit on said light reception unit.

33. A virtual reality providing system according to claim 32, wherein said light-interceptive means (115) is a light-interceptive curtain which is hung on said light source unit so that the light-interceptive curtain can enclose a range of said user's movements.

* * * * *